(12) United States Patent
Wiley et al.

(10) Patent No.: US 8,751,965 B2
(45) Date of Patent: Jun. 10, 2014

(54) INTERFACE FOR TOGGLING OBJECTS

(75) Inventors: Jon Wiley, San Jose, CA (US); Sean McBride, San Francisco, CA (US); Michael Hart Leggett, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 836 days.

(21) Appl. No.: 12/408,679

(22) Filed: Mar. 21, 2009

(65) Prior Publication Data
US 2010/0241994 A1    Sep. 23, 2010

(51) Int. Cl.
*G06F 3/048*    (2013.01)
(52) U.S. Cl.
USPC ............................ 715/832; 715/835; 715/823
(58) Field of Classification Search
USPC .......................................... 715/832, 835, 823
See application file for complete search history.

(56) References Cited

U.S. PATENT DOCUMENTS

| | | | |
|---|---|---|---|
| 6,901,556 B2 * | 5/2005 | Bosma et al. | 715/769 |
| 7,047,503 B1 * | 5/2006 | Parrish et al. | 715/863 |
| 7,349,858 B1 | 3/2008 | Mcgrady et al. | |
| 2005/0040250 A1 | 2/2005 | Wruck | |
| 2007/0208598 A1 | 9/2007 | McGrady et al. | |

FOREIGN PATENT DOCUMENTS

WO    2010/111139 A2    9/2010

OTHER PUBLICATIONS

"How to produce a Gmail-style checkbox selection interface?" (hereinafter Gmail) http://ask.metafilter.com/38539/How-to-produce-a-Gmailstyle-checkbox-selection-interface Published on May 20, 2006.*
"Is there a way to keep this tool sticky" Published on Dec. 19, 2008 (hereinafter Acrobat) http://acrobatusers.com/tutorials/there-way-keep-tool-sticky.*
International Search Report and Written Opinion for PCT Application No. PCT/US2010/027985, mailed Oct. 20, 2010, 9 pages.
Office Action for Chinese Application No. 201080012004.1 (with translation), mailed Sep. 9, 2013, 9 pages.

* cited by examiner

*Primary Examiner* — Weilun Lo
*Assistant Examiner* — Peiyong Weng
(74) *Attorney, Agent, or Firm* — Brake Hughes Bellermann LLP

(57) ABSTRACT

A first single-action input is received indicating a start tracking request and including information identifying a first current location of a user-controlled object on a user display device. A second single-action input is received indicating a movement of the object across the display device to a first different location and including a stop tracking request. A first display object associated with the first current location and a second display object associated with the first different location are determined. A group of selected display objects is determined including the first and second display objects. Display objects associated with locations displayed in an area spanning a first region located between the first current location and the first different location are determined, where a selection of the selected display objects is based on the first start tracking request and the first stop tracking request, with no input associated with a modifier input.

26 Claims, 18 Drawing Sheets

200

210 — Receive a first single-action input from a user indicating a first start tracking request and including information identifying a first current location of a user-controlled object on a user display device, at a time when the user-controlled object is located at the first current location and the user initiates the first start tracking request

220 — Receive a second single-action input from the user indicating a movement of the user-controlled object across the user display device to a first different location on the user display device and including a first stop tracking request at a time when the user-controlled object is located at the first different location and the user initiates the first stop tracking request

230 — Determine a first display object associated with the first current location and a second display object associated with the first different location

240 — Determine a group of selected display objects including the first and second display objects, and display objects associated with locations displayed in an area of the user display device spanning a first region located between the first current location and the first different location, a selection of the selected display objects based on the first start tracking request and the first stop tracking request, with no input associated with a modifier input

250 — Modify a first current state of the first display object to a first different state, after determining the group

260 — Set states associated with the selected display objects included in the determined group, other than the first display object

270 — Receive a third single-action input from the user indicating a second start tracking request and including information identifying a second current location of the user-controlled object on the user display device, at a time when the user-controlled object is located at the second current location and the user initiates the second start tracking request, after the modifying the first current state

280 — Determine a third display object associated with the second current location, with no input associated with a modifier input, wherein the third display object is different from the first display object and the receipt of the second start tracking request does not initiate further processing of the modified state of the first display object

| | | |
|---|---|---|
| | ☐ ☆ Bill Richards | Alaska Cruise aftermath and photos |
| 304 | ☑ ☆ Jane Smith | Alaska Cruise special offers My trav |
| | ☑ ☆ Jane Smith | Alaska trip I'm super excited about |
| | ☑ ☆ Jenny Parsons | Let's go on a cruise! Hey guys, it w |
| | ☐ ☆ BestBuy.com | There's still time! Get Great Deals |
| | ☐ ☆ Nortwest Airlines | Important Announcement Don't miss |
| 302 | ☐ ☆ CitiBank | Your bill is ready for payment Your |
| | ☐ ☆ Southwest Airlines | Ticketless Confirmation -SMITH/JA |
| | ☐ ☆ Netflix Shipping | For Sat: Nip/Tuck: Season 1: Disc |
| | ☐ ☆ Netflix Shipping | For Sat: The Chronicles of Narnia: T |
| | ☐ ☆ Apple | Now get an iPod nano and iLife '08 |
| | ☐ ☆ Southwest Airlines | Ticketless Confirmation -SMITH/JA |
| | ☐ ☆ Pacific Utilities | Your monthly electric service bill for |
| | ☐ ☆ Army Harkins | Invitation to connect on LinkedIn Ja |
| | ☐ ☆ Bob Smith | TRAVEL INFO FOR MOM AND DAD |
| | ☐ ☆ Pacific Utilities | Your monthly electric service bill for |

| | | |
|---|---|---|
| | ☐ ☆ Bill Richards | Alaska Cruise aftermath and photos |
| 304 | ☑ ☆ Jane Smith | Alaska Cruise special offers My trav |
| | ☑ ☆ Jane Smith | Alaska trip I'm super excited about |
| | ☑ ☆ Jenny Parsons | Let's go on a cruise! Hey guys, it w |
| | ☐ ☆ BestBuy.com | There's still time! Get Great Deals |
| 306 | ☐ ☆ Nortwest Airlines | Important Announcement Don't miss |
| | ☐ ☆ CitiBank | Your bill is ready for payment Your |
| | ☐ ☆ Southwest Airlines | Ticketless Confirmation -SMITH/JA |
| 302 | ☐ ☆ Netflix Shipping | For Sat: Nip/Tuck: Season 1: Disc |
| | ☐ ☆ Netflix Shipping | For Sat: The Chronicles of Narnia: T |
| | ☐ ☆ Apple | Now get an iPod nano and iLife '08 |
| | ☐ ☆ Southwest Airlines | Ticketless Confirmation -SMITH/JA |
| | ☐ ☆ Pacific Utilities | Your monthly electric service bill for |
| | ☐ ☆ Army Harkins | Invitation to connect on LinkedIn Ja |
| | ☐ ☆ Bob Smith | TRAVEL INFO FOR MOM AND DAD |
| | ☐ ☆ Pacific Utilities | Your monthly electric service bill for |

300

| | | |
|---|---|---|
| | ☐☆ Bill Richards | Alaska Cruise aftermath and photos |
| 304 | ☑☆ Jane Smith | Alaska Cruise special offers My trav |
| | ☑☆ Jane Smith | Alaska trip I'm super excited about |
| | ☑☆ Jenny Parsons | Let's go on a cruise! Hey guys, it w |
| | ☐☆ BestBuy.com | There's still time! Get Great Deals |
| 306 | ☑☆ Nortwest Airlines | Important Announcement Don't miss |
| | ☑☆ CitiBank | Your bill is ready for payment Your |
| | ☑☆ Southwest Airlines | Ticketless Confirmation -SMITH/JA |
| 302 | ☐☆ Netflix Shipping | For Sat: Nip/Tuck: Season 1: Disc |
| | ☐☆ Netflix Shipping | For Sat: The Chronicles of Narnia: T |
| | ☐☆ Apple | Now get an iPod nano and iLife '08 |
| | ☐☆ Southwest Airlines | Ticketless Confirmation -SMITH/JA |
| | ☐☆ Pacific Utilities | Your monthly electric service bill for |
| | ☐☆ Army Harkins | Invitation to connect on LinkedIn Ja |
| | ☐☆ Bob Smith | TRAVEL INFO FOR MOM AND DAD |
| | ☐☆ Pacific Utilities | Your monthly electric service bill for |

| | | |
|---|---|---|
| ☐ ☆ | Bill Richards | Alaska Cruise aftermath and photos |
| ☑ ☆ | Jane Smith | Alaska Cruise special offers My trav |
| ☑ ☆ | Jane Smith | Alaska trip I'm super excited about |
| ☑ ☆ | Jenny Parsons | Let's go on a cruise! Hey guys, it w |
| ☐ ☆ | BestBuy.com | There's still time! Get Great Deals |
| ☑ ☆ | Nortwest Airlines | Important Announcement Don't miss |
| ☑ ☆ | CitiBank | Your bill is ready for payment Your |
| ☑ ☆ | Southwest Airlines | Ticketless Confirmation -SMITH/JA |
| ☐ ☆ | Netflix Shipping | For Sat: Nip/Tuck: Season 1: Disc |
| ☐ ☆ | Netflix Shipping | For Sat: The Chronicles of Narnia: T |
| ☐ ☆ | Apple | Now get an iPod nano and iLife '08 |
| ☐ ☆ | Southwest Airlines | Ticketless Confirmation -SMITH/JA |
| ☐ ☆ | Pacific Utilities | Your monthly electric service bill for |
| ☐ ☆ | Army Harkins | Invitation to connect on LinkedIn Ja |
| ☐ ☆ | Bob Smith | TRAVEL INFO FOR MOM AND DAD |
| ☐ ☆ | Pacific Utilities | Your monthly electric service bill for |

304 — rows 2-4
306 — rows 6-8
302 — Netflix Shipping row

| | | |
|---|---|---|
| ☐ ☆ | Bill Richards | Alaska Cruise aftermath and photos |
| ☑ ☆ | Jane Smith | Alaska Cruise special offers My trav |
| ☑ ☆ | Jane Smith | Alaska trip I'm super excited about |
| ☑ ☆ | Jenny Parsons | Let's go on a cruise! Hey guys, it w |
| ☐ ☆ | BestBuy.com | There's still time! Get Great Deals |
| ☑ ☆ | Nortwest Airlines | Important Announcement Don't miss |
| ☑ ☆ | CitiBank | Your bill is ready for payment Your |
| ☑ ☆ | Southwest Airlines | Ticketless Confirmation -SMITH/JA |
| ☐ ☆ | Netflix Shipping | For Sat: Nip/Tuck: Season 1: Disc |
| ☐ ☆ | Netflix Shipping | For Sat: The Chronicles of Narnia: T |
| ☐ ☆ | Apple | Now get an iPod nano and iLife '08 |
| ☐ ☆ | Southwest Airlines | Ticketless Confirmation -SMITH/JA |
| ☐ ☆ | Pacific Utilities | Your monthly electric service bill for |
| ☐ ☆ | Army Harkins | Invitation to connect on LinkedIn Ja |
| ☐ ☆ | Bob Smith | TRAVEL INFO FOR MOM AND DAD |
| ☐ ☆ | Pacific Utilities | Your monthly electric service bill for |

304 — rows 2-4
306 — rows 6-8
402 — rows 10-16
302'

| | | |
|---|---|---|
| | ☐☆ Bill Richards | Alaska Cruise aftermath and photos |
| 304 | ☑☆ Jane Smith | Alaska Cruise special offers My trav |
| | ☑☆ Jane Smith | Alaska trip I'm super excited about |
| | ☑☆ Jenny Parsons | Let's go on a cruise! Hey guys, it w |
| | ☐☆ BestBuy.com | There's still time! Get Great Deals |
| 306 | ☑☆ Nortwest Airlines | Important Announcement Don't miss |
| | ☑☆ CitiBank | Your bill is ready for payment Your |
| | ☑☆ Southwest Airlines | Ticketless Confirmation -SMITH/JA |
| | ☐☆ Netflix Shipping | For Sat: Nip/Tuck: Season 1: Disc |
| 402 | ☑☆ Netflix Shipping | For Sat: The Chronicles of Narnia: T |
| | ☑☆ Apple | Now get an iPod nano and iLife '08 |
| | ☑☆ Southwest Airlines | Ticketless Confirmation -SMITH/JA |
| | ☑☆ Pacific Utilities | Your monthly electric service bill for |
| | ☑☆ Army Harkins | Invitation to connect on LinkedIn Ja |
| | ☑☆ Bob Smith | TRAVEL INFO FOR MOM AND DAD |
| | ☑☆ Pacific Utilities | Your monthly electric service bill for |

| | | |
|---|---|---|
| 302 | ☐ ☆ Bill Richards | Alaska Cruise aftermath and photos |
| | ☐ ☆ Jane Smith | Alaska Cruise special offers My trav |
| | ☐ ☆ Jane Smith | Alaska trip I'm super excited about |
| | ☐ ☆ Jenny Parsons | Let's go on a cruise! Hey guys, it w |
| | ☐ ☆ BestBuy.com | There's still time! Get Great Deals |
| | ☐ ☆ Nortwest Airlines | Important Announcement Don't miss |
| | ☐ ☆ CitiBank | Your bill is ready for payment Your |
| | ☐ ☆ Southwest Airlines | Ticketless Confirmation -SMITH/JA |
| | ☐ ☆ Netflix Shipping | For Sat: Nip/Tuck: Season 1: Disc |
| | ☐ ☆ Netflix Shipping | For Sat: The Chronicles of Narnia: T |
| | ☐ ☆ Apple | Now get an iPod nano and iLife '08 |
| | ☐ ☆ Southwest Airlines | Ticketless Confirmation -SMITH/JA |
| | ☐ ☆ Pacific Utilities | Your monthly electric service bill for |
| | ☐ ☆ Army Harkins | Invitation to connect on LinkedIn Ja |
| | ☐ ☆ Bob Smith | TRAVEL INFO FOR MOM AND DAD |
| | ☐ ☆ Pacific Utilities | Your monthly electric service bill for |

| | | |
|---|---|---|
| 502 | ☐ ☆ Bill Richards | Alaska Cruise aftermath and photos |
| | ☐ ☆ Jane Smith | Alaska Cruise special offers My trav |
| | ☐ ☆ Jane Smith | Alaska trip I'm super excited about |
| | ☐ ☆ Jenny Parsons | Let's go on a cruise! Hey guys, it w |
| | ☐ ☆ BestBuy.com | There's still time! Get Great Deals |
| | ☐ ☆ Nortwest Airlines | Important Announcement Don't miss |
| | ☐ ☆ CitiBank | Your bill is ready for payment Your |
| | ☐ ☆ Southwest Airlines | Ticketless Confirmation -SMITH/JA |
| | ☐ ☆ Netflix Shipping | For Sat: Nip/Tuck: Season 1: Disc |
| | ☐ ☆ Netflix Shipping | For Sat: The Chronicles of Narnia: T |
| | ☐ ☆ Apple | Now get an iPod nano and iLife '08 |
| 302 | ☐ ☆ Southwest Airlines | Ticketless Confirmation -SMITH/JA |
| | ☐ ☆ Pacific Utilities | Your monthly electric service bill for |
| | ☐ ☆ Army Harkins | Invitation to connect on LinkedIn Ja |
| | ☐ ☆ Bob Smith | TRAVEL INFO FOR MOM AND DAD |
| | ☐ ☆ Pacific Utilities | Your monthly electric service bill for |

| ☑☆ Bill Richards | Alaska Cruise aftermath and photos |
|---|---|
| ☑☆ Jane Smith | Alaska Cruise special offers My trav |
| ☑☆ Jane Smith | Alaska trip I'm super excited about |
| ☑☆ Jenny Parsons | Let's go on a cruise! Hey guys, it w |
| ☑☆ BestBuy.com | There's still time! Get Great Deals |
| ☑☆ Nortwest Airlines | Important Announcement Don't miss |
| ☑☆ CitiBank | Your bill is ready for payment Your |
| ☑☆ Southwest Airlines | Ticketless Confirmation -SMITH/JA |
| ☑☆ Netflix Shipping | For Sat: Nip/Tuck: Season 1: Disc |
| ☑☆ Netflix Shipping | For Sat: The Chronicles of Narnia: T |
| ☑☆ Apple | Now get an iPod nano and iLife '08 |
| ☐☆ Southwest Airlines | Ticketless Confirmation -SMITH/JA |
| ☐☆ Pacific Utilities | Your monthly electric service bill for |
| ☐☆ Army Harkins | Invitation to connect on LinkedIn Ja |
| ☐☆ Bob Smith | TRAVEL INFO FOR MOM AND DAD |
| ☐☆ Pacific Utilities | Your monthly electric service bill for |

| ☑☆ Bill Richards | Alaska Cruise aftermath and photos |
|---|---|
| ☑☆ Jane Smith | Alaska Cruise special offers My trav |
| ☑☆ Jane Smith | Alaska trip I'm super excited about |
| ☑☆ Jenny Parsons | Let's go on a cruise! Hey guys, it w |
| ☑☆ BestBuy.com | There's still time! Get Great Deals |
| ☑☆ Nortwest Airlines | Important Announcement Don't miss |
| ☑☆ CitiBank | Your bill is ready for payment Your |
| ☑☆ Southwest Airlines | Ticketless Confirmation -SMITH/JA |
| ☑☆ Netflix Shipping | For Sat: Nip/Tuck: Season 1: Disc |
| ☑☆ Netflix Shipping | For Sat: The Chronicles of Narnia: T |
| ☑☆ Apple | Now get an iPod nano and iLife '08 |
| ☐☆ Southwest Airlines | Ticketless Confirmation -SMITH/JA |
| ☐☆ Pacific Utilities | Your monthly electric service bill for |
| ☐☆ Army Harkins | Invitation to connect on LinkedIn Ja |
| ☐☆ Bob Smith | TRAVEL INFO FOR MOM AND DAD |
| ☐☆ Pacific Utilities | Your monthly electric service bill for |

| | | |
|---|---|---|
| 502 | ☑☆ Bill Richards | Alaska Cruise aftermath and photos |
| | ☑☆ Jane Smith | Alaska Cruise special offers My trav |
| 504 | ☐☆ Jane Smith | Alaska trip I'm super excited about |
| | ☐☆ Jenny Parsons | Let's go on a cruise! Hey guys, it w |
| | ☐☆ BestBuy.com | There's still time! Get Great Deals |
| | ☐☆ Nortwest Airlines | Important Announcement Don't miss |
| | ☐☆ CitiBank | Your bill is ready for payment Your |
| 302 | ☑☆ Southwest Airlines | Ticketless Confirmation -SMITH/JA |
| | ☑☆ Netflix Shipping | For Sat: Nip/Tuck: Season 1: Disc |
| | ☑☆ Netflix Shipping | For Sat: The Chronicles of Narnia: T |
| | ☑☆ Apple | Now get an iPod nano and iLife '08 |
| | ☐☆ Southwest Airlines | Ticketless Confirmation -SMITH/JA |
| | ☐☆ Pacific Utilities | Your monthly electric service bill for |
| | ☐☆ Army Harkins | Invitation to connect on LinkedIn Ja |
| | ☐☆ Bob Smith | TRAVEL INFO FOR MOM AND DAD |
| | ☐☆ Pacific Utilities | Your monthly electric service bill for |

| | | |
|---|---|---|
| 502 | 504 | ☑☆ Bill Richards | Alaska Cruise aftermath and photos |
| | | ☑☆ Jane Smith | Alaska Cruise special offers My trav |
| | | ☐☆ Jane Smith | Alaska trip I'm super excited about |
| | | ☐☆ Jenny Parsons | Let's go on a cruise! Hey guys, it w |
| | | ☐☆ BestBuy.com | There's still time! Get Great Deals |
| | | ☐☆ Nortwest Airlines | Important Announcement Don't miss |
| | | ☐☆ CitiBank | Your bill is ready for payment Your |
| 302 | | ☑☆ Southwest Airlines | Ticketless Confirmation -SMITH/JA |
| | | ☑☆ Netflix Shipping | For Sat: Nip/Tuck: Season 1: Disc |
| | | ☑☆ Netflix Shipping | For Sat: The Chronicles of Narnia: T |
| | | ☑☆ Apple | Now get an iPod nano and iLife '08 |
| | | ☐☆ Southwest Airlines | Ticketless Confirmation -SMITH/JA |
| | | ☐☆ Pacific Utilities | Your monthly electric service bill for |
| | | ☐☆ Army Harkins | Invitation to connect on LinkedIn Ja |
| | | ☐☆ Bob Smith | TRAVEL INFO FOR MOM AND DAD |
| | | ☐☆ Pacific Utilities | Your monthly electric service bill for |

| | | |
|---|---|---|
| 502 | | ☑☆ Bill Richards | Alaska Cruise aftermath and photos |
| | | ☑☆ Jane Smith | Alaska Cruise special offers My trav |
| | 504 | ☐☆ Jane Smith | Alaska trip I'm super excited about |
| | | ☐☆ Jenny Parsons | Let's go on a cruise! Hey guys, it w |
| | | ☐☆ BestBuy.com | There's still time! Get Great Deals |
| | | ☐☆ Nortwest Airlines | Important Announcement Don't miss |
| | | ☐☆ CitiBank | Your bill is ready for payment Your |
| | | ☑☆ Southwest Airlines | Ticketless Confirmation -SMITH/JA |
| | | ☑☆ Netflix Shipping | For Sat: Nip/Tuck: Season 1: Disc |
| | | ☑☆ Netflix Shipping | For Sat: The Chronicles of Narnia: T |
| | | ☑☆ Apple | Now get an iPod nano and iLife '08 |
| | | ☐☆ Southwest Airlines | Ticketless Confirmation -SMITH/JA |
| 506 | | ☐☆ Pacific Utilities | Your monthly electric service bill for |
| | | ☐☆ Army Harkins | Invitation to connect on LinkedIn Ja |
| | | ☐☆ Bob Smith | TRAVEL INFO FOR MOM AND DAD |
| 302 | | ☐☆ Pacific Utilities | Your monthly electric service bill for |

FIG.5g

| | | |
|---|---|---|
| | ☑☆ Bill Richards | Alaska Cruise aftermath and photos |
| | ☑☆ Jane Smith | Alaska Cruise special offers My trav |
| | ☑☆ Jane Smith | Alaska trip I'm super excited about |
| | ☑☆ Jenny Parsons | Let's go on a cruise! Hey guys, it w |
| | ☑☆ BestBuy.com | There's still time! Get Great Deals |
| | ☑☆ Nortwest Airlines | Important Announcement Don't miss |
| | ☑☆ CitiBank | Your bill is ready for payment Your |
| | ☑☆ Southwest Airlines | Ticketless Confirmation -SMITH/JA |
| | ☑☆ Netflix Shipping | For Sat: Nip/Tuck: Season 1: Disc |
| | ☑☆ Netflix Shipping | For Sat: The Chronicles of Narnia: T |
| | ☑☆ Apple | Now get an iPod nano and iLife '08 |
| | ☑☆ Southwest Airlines | Ticketless Confirmation -SMITH/JA |
| | ☑☆ Pacific Utilities | Your monthly electric service bill for |
| | ☑☆ Army Harkins | Invitation to connect on LinkedIn Ja |
| | ☑☆ Bob Smith | TRAVEL INFO FOR MOM AND DAD |
| | ☐☆ Pacific Utilities | Your monthly electric service bill for |

FIG.5h

|     | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|-----|---|---|---|---|---|---|---|---|---|---|----|----|----|----|----|----|----|----|----|----|----|----|----|----|
| Mon |   |   |   |   |   |   |   |   |   |   |    |    |    |    |    |    |    |    |    |    |    |    |    |    |
| Tue |   |   |   |   |   |   |   |   |   |   |    |    |    |    |    |    |    |    |    |    |    |    |    |    |
| Wed |   |   |   |   |   |   |   |   |   |   |    |    |    |    |    |    |    |    |    |    |    |    |    |    |
| Thu |   |   |   |   |   |   |   |   |   |   |    |    |    |    |    |    |    |    |    |    |    |    |    |    |
| Fri |   |   |   |   |   |   |   |   |   |   |    |    |    |    |    |    |    |    |    |    |    |    |    |    |
| Sat |   |   |   |   |   |   |   |   |   |   |    |    |    |    |    |    |    |    |    |    |    |    |    |    |
| Sun |   |   |   |   |   |   |   |   |   |   |    |    |    |    |    |    |    |    |    |    |    |    |    |    |

Cell Toggling Mode:
- ⦿ Select boxes are toggled based on the initial box's state.
- ○ Select boxes are toggled based on their own state.

INTERFACE FOR TOGGLING OBJECTS

TECHNICAL FIELD

This description relates to toggling objects, in particular, by selecting the objects to change a state associated with the objects. This description further relates to toggling options by selecting objects representing the options via an interface using single-action start and stop tracking operations such as click or touch, drag, and release operations with no modifier input.

BACKGROUND

Many computer user interfaces support selection and de-selection of objects for processing by applications. For example, a mail order business may provide a browser application that displays boxes or buttons that may be selected for ordering various products, or for selecting options for billing and shipment. As another example, a user of a calendar or scheduler may select one or more groups of hours or days that may cover several different time intervals for scheduling various events or activities. Further, a user of a file system may select groups of files for further processing.

One example technique for selecting objects includes using a mouse such that the mouse may be clicked on an object to select an object. A user interface may thus receive an indication that the mouse has been depressed and released while a cursor is over the object on a display device such as a screen. For example, an object displayed to the user may appear as a box on a screen. When the user depresses and releases a button on the mouse while a cursor is over the box displayed on the screen, the interface may change a state of the object associated with the displayed box, and may display a check mark in the box to indicate to the user that the object has been toggled on. Similarly, if the user repeats the action of depressing and releasing the mouse button while the cursor is over the displayed box, the box may appear without the check mark, and the state of the associated object may be toggled to an off state.

An extension of the toggling technique discussed above may include depressing the mouse button while the cursor is over a first object on the screen, and dragging the mouse while also depressing a modifier key such as a "shift" key, a "control" key (i.e., a Ctrl key), or an "Alt" key on a keyboard, and releasing the mouse button when the cursor is over a different object on the screen. This action may allow the user to select and toggle multiple objects that appear as contiguous objects on the screen that include the first object, the different object, and any objects that may appear between these objects on the screen. It may also be possible to de-select (and toggle to a different state) some of the multiple selected objects, for example, by depressing a modifier key such as the "control" key while clicking the mouse on individual ones of the previously selected objects. This type of operation may be used to select and toggle discontinuous sets of objects as they appear on the display device for the user.

In the examples discussed above, it may be possible to de-select all selected objects, removing the toggle, by clicking (i.e., depressing and releasing the mouse button, with no modifier key depressed) in an area of the screen that is external to the selected area. In some environments, such as a web browser, it may not be feasible to rely on a modifier key or the operation of clicking on an area "outside" the selected area, as use of modifier keys or other modifier inputs may be an unexpected interaction for many applications, or the use of modifier keys may not be available across all platforms supported by the interface. Further, registering a mouse click "outside" the boundaries of object selection sets as a deselect command may conflict with other intended consequences of clicking (e.g., clicking a mouse to submit a form to a server).

SUMMARY

In a first general aspect, a computer-implemented method includes receiving a first single-action input from a user indicating a first start tracking request and including information identifying a first current location of a user-controlled object on a user display device, at a time when the user-controlled object is located at the first current location and the user initiates the first start tracking request. A second single-action input is received from the user indicating a movement of the user-controlled object across the user display device to a first different location on the user display device and including a first stop tracking request at a time when the user-controlled object is located at the first different location and the user initiates the first stop tracking request. A first display object associated with the first current location is determined, and a second display object associated with the first different location is determined. A group of selected display objects is determined including the first and second display objects. Display objects associated with locations displayed in an area of the user display device spanning a first region located between the first current location and the first different location are determined, where a selection of the selected display objects is based on the first start tracking request and the first stop tracking request, with no input associated with a modifier input. A first current state of the first display object is modified to a first different state after determining the group. States associated with the selected display objects included in the determined group are set, other than the first display object. A third single-action input is received from the user indicating a second start tracking request and including information identifying a second current location of the user-controlled object on the user display device, at a time when the user-controlled object is located at the second current location and the user initiates the second start tracking request, after the modifying the first current state. A third display object associated with the second current location is determined, with no input associated with a modifier input, where the third display object is different from the first display object and the receipt of the second start tracking request does not initiate further processing of the modified state of the first display object.

Implementations can include one or more of the following features. For example, while the user-controlled object is moving to the first different location, an appearance to the user of an area of the user display device spanning a first moving region located between the first current location and a moving location of the user-controlled object can be modified during movement to the first different location, indicating a first highlighted state of display objects displayed in the first moving region. Receiving the first single-action input from the user can include receiving a first indication of a depression of a button on a user interface input device. The user interface input device can include one of a mouse device, a touchpad device, or a trackball device.

Receiving the first single-action input from the user can include receiving a first indication of a contact with a display screen of the user display device. Receiving the second single-action input from the user can include receiving a second indication of a drag operation of a user interface input device, where the first stop tracking request indicates a release of a contact with the user interface input device, with no input associated with a modifier input. Determining the group of selected display objects including the first and second display objects can include determining, by an application running in a web browser, the group of selected display objects including the first and second display objects, and display objects associated with locations displayed in an area of the user display device spanning a first region located between the first current location and the first different location and interior to a web browser window, where the selection of the selected display objects is based on the first start tracking request, the first stop tracking request, and the determination of the first and second display objects, with no input associated with a modifier input.

Modifying the first current state of the first display object to the first different state can include toggling the first current state of the first display object to the first different state, after determining the group. Modifying the first current state of the first display object to the first different state can include toggling a first current binary state of the first display object to a first different binary state, after determining the group. Setting states associated with the selected display objects, other than the first display object, can include setting states associated with the selected display objects included in the determined group, other than the first display object, to the first different state. Setting states associated with the selected display objects included in the determined group, other than the first display object, can include, for each of the selected display objects included in the determined group, other than the first display object, modifying the state of the each display object to a state that is different from a state that is associated with the each display object at the time of determining the group.

The method can also include: (1) receiving a fourth single-action input from the user indicating a movement of the user-controlled object across the user display device to a second different location on the user display device and including a second stop tracking request at a time when the user-controlled object is located at the second different location and the user initiates the second stop tracking request; (2) determining a fourth display object associated with the second different location; (3) determining another group of selected display objects including the third and fourth display objects, where the display objects are associated with locations displayed in an area of the user display device spanning a second region located between the second current location and the second different location, and a selection of the another group of selected display objects is based on the second start tracking request and the second stop tracking request, with no input associated with a modifier input; and (4) while maintaining the states of display objects associated with locations displayed in an area of the user display device spanning regions of the user display device external to the second region, modifying a second current state of the third display object to a second different state, after determining the another group, and setting states associated with the another group of selected display objects in the determined another group, other than the third display object. The group of selected display objects can include a group of selected options icons.

Modifying the first current state of the first display object to the first different state can include one of displaying a check mark in a box representing the first display object or displaying an un-checked box representing the first display object, after determining the group. Setting the states associated with the selected display objects included in the determined group, other than the first display object, can include displaying boxes representing the selected display objects in accordance with a same check mark status of the displayed box representing the first object after modifying the first current state.

In another general aspect a system can include an instruction store configured to store machine-executable instructions, an instruction processor configured to execute at least a portion of the machine-executable instructions stored in the instruction store, and an object toggler interface. The object toggler interface includes a click input engine configured to receive a first single-action input from a user indicating a first start tracking request and including information identifying a first current location of a user-controlled object on a user display device, at a time when the user-controlled object is located at the first current location and the user initiates the first start tracking request. The object toggler interface includes a drag input engine configured to receive a second single-action input from the user indicating a movement of the user-controlled object across the user display device to a first different location on the user display device and including a first stop tracking request at a time when the user-controlled object is located at the first different location and the user initiates the first stop tracking request. The object toggler interface includes an object bounds detector configured to determine a first display object associated with the first current location and a second display object associated with the first different location. The object toggler interface includes an object selection engine configured to determine a group of selected display objects including the first and second display objects, and display objects associated with locations displayed in an area of the user display device spanning a first region located between the first current location and the first different location, a selection of the selected display objects based on the first start tracking request and the first stop tracking request, with no input associated with a modifier input. The object toggler interface includes a state modification engine configured to modify a first current state of the first display object to a first different state, after the group is determined. The object toggler interface includes a state setting engine configured to set states associated with the selected display objects included in the determined group, other than the first display object, where the click input engine is configured to receive a third single-action input from the user indicating a second start tracking request and including information identifying a second current location of the user-controlled object on the user display device, at a time when the user-controlled object is located at the second current location and the user initiates the second start tracking request, after the first current state is modified. The object bounds detector is configured to determine a third display object associated with the second current location, with no input associated with a modifier input, where the third display object is different from the first display object and the receipt of the second start tracking request does not initiate further processing of the modified state of the first display object.

In another general aspect a computer program product tangibly embodied on a computer-readable medium is configured to cause a data processing apparatus to receive a first single-action input from a user indicating a first start tracking request and including information identifying a first current location of a user-controlled object on a user display device, at a time when the user-controlled object is located at the first current location and the user initiates the first start tracking request. The computer program product is further configured to cause the data processing apparatus to receive a second single-action input from the user indicating a movement of the user-controlled object across the user display device to a first different location on the user display device and including a first stop tracking request at a time when the user-controlled object is located at the first different location and the user initiates the first stop tracking request. The computer program product is further configured to cause the data processing apparatus to determine a first display object associated with the first current location and a second display object associated with the first different location. The computer program product is further configured to cause the data processing apparatus to determine a group of selected display objects including the first and second display objects, and display objects associated with locations displayed in an area of the user display device spanning a first region located between the first current location and the first different location, where a selection of the selected display objects is based on the first start tracking request and the first stop tracking request, with no input associated with a modifier input. The computer program product is further configured to cause the data processing apparatus to modify a first current state of the first display object to a first different state, after determining the group. The computer program product is further configured to cause the data processing apparatus to set states associated with the selected display objects included in the determined group, other than the first display object. The computer program product is further configured to cause the data processing apparatus to receive a third single-action input from the user indicating a second start tracking request and including information identifying a second current location of the user-controlled object on the user display device, at a time when the user-controlled object is located at the second current location and the user initiates the second start tracking request, and after the first current state is modified. The computer program product is further configured to cause the data processing apparatus to determine a third display object associated with the second current location, with no input associated with a modifier input, wherein the third display object is different from the first display object and the receipt of the second start tracking request does not initiate further processing of the modified state of the first display object.

The details of one or more implementations are set forth in the accompanying drawings and the description below. Other features will be apparent from the description and drawings, and from the claims.

BRIEF DESCRIPTION OF THE DRAWINGS

FIG. 2 is an example flow chart of a process for toggling objects in accordance with the example system of FIG. 1.

FIGS. 3a-3c are screen shots of example object toggling operations.

FIGS. 4a-4c are screen shots of example object toggling operations.

FIGS. 5a-5h are screen shots of example object toggling operations.

FIG. 6 is a screen shot of an example two-dimensional user application.

FIGS. 7a-7d are screen shots of example object toggling operations based on the example of FIG. 6.

FIGS. 8a-8d are screen shots of example object toggling operations based on the example of FIG. 6.

DETAILED DESCRIPTION

A user interface may provide a set of state modification options to a user and may allow, via click, touch, click-drag-release, or touch-drag-release, the toggling of an individual option or a set of options, such as selection or de-selection of display objects. Additional options of interaction behavior may be provided, and may include toggling based on the state of the initially selected display object or on the state of each display object in a set or group of selected display objects.

Figure 9:
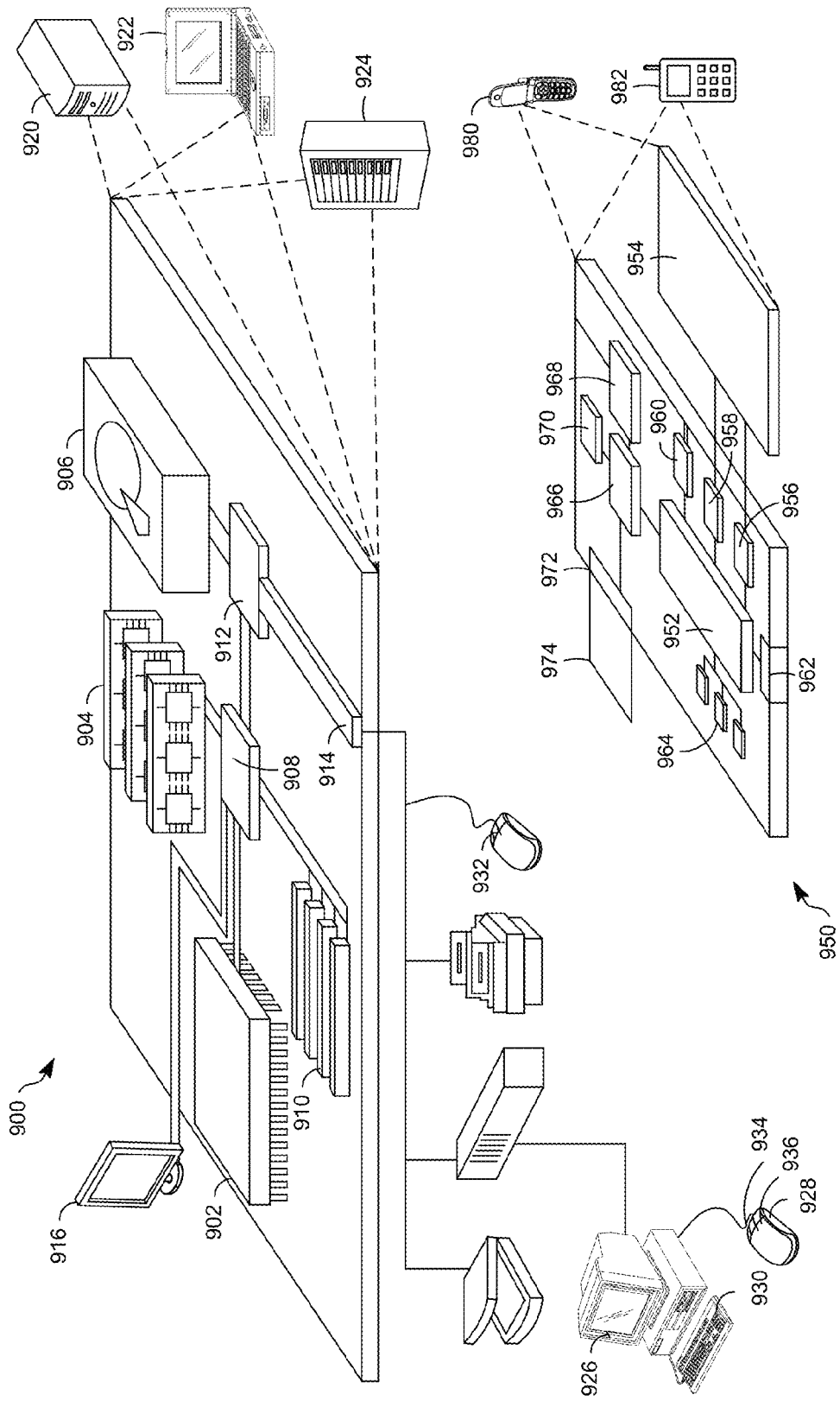
FIG. 9 is a block diagram of an example computer device and an example mobile computer device that can be used to implement example techniques described herein.

For example, it may be cumbersome to manipulate each individual display object in a large set of display objects associated with toggles such as binary toggles, particularly when the display objects may be related in some sense. In this context, a binary toggle may include an object that may have a state having a binary value (e.g., 0 or 1, on or off, selected or unselected, etc.), and may be toggled by an operation modifying its state (i.e., modifying the state from an initial state to a different state) or setting its state (i.e., setting a state to a particular value, regardless of its initial state). One skilled in the art of data processing will appreciate that there may be objects having states that can take on values other than simple binary values, without departing from the spirit of the discussion herein. In this context, an "object" may include any type of item that may be represented by data processing systems. For example, a display object may include an icon displayed to a user via a display device (e.g., display 916 or display 926 as shown in FIG. 9), such that the icon represents a data item manipulated by executable code in cooperation with executable code providing the displayed icon on the display device. For example, the icon may include a box that may be checked or unchecked, or a radio button that may be filled or unfilled. For example, objects may include markup language objects such as HyperText Markup Language (HTML) objects or eXtensible Markup Language (XML) objects, or other objects supported by languages such as Java.

For example, a box may be displayed on a display device (e.g., display 926 as shown in FIG. 9) to symbolize a selectable display object for the user of a system. For example, the user may manipulate an input device such as a computer mouse device (e.g., mouse 928 or mouse 932 as shown in FIG. 9) to cause an icon such as a pointer or cursor to move to various positions on the display device. The positions on the display device may thus be represented as coordinates of points on a display device, and the movement of the cursor may be determined based on input generated by movement of the mouse device. A selection of an icon such as a box on the display may be generated by the user's positioning of the cursor over the box on the screen, and by the user's depression of a button on the mouse (e.g., a left button on the mouse such as mouse button 934 as shown in FIG. 9), which may also be referred to as a "click" of the mouse. After a selection operation, the box may be displayed as a checked box (e.g., a box with a check mark in it), and the display object associated with the checked box may be assigned a "selected" state.

One skilled in the art of data processing will appreciate that there are many input devices that may be used, including, but not limited to, touch pads, trackball devices, touch screen devices, eye scan input devices, speech controlled input devices, and other types of devices configured to receive manipulation input from a user, without departing from the spirit or scope of the present discussion.

If a relationship exists among a group of display objects, it may be likely that a user may wish to toggle several display objects in sequence, or the user may wish to toggle the display objects in accordance with common patterns (e.g., scheduling in accordance with blocks of times over weekly or monthly time periods). Additionally, it may be advantageous to toggle a number of display objects in discontinuous groups or sets.

For example, a user may wish to select a block of hours that span several days. For example, the user may wish to select all of the work hours over a week as well as Saturday afternoons. Example systems discussed herein may provide an interface allowing the user to click and drag (or, for example, touch and drag or contact and drag) across the set of hours, toggling them as "selected." The user may then select additional hours (e.g., Saturday afternoon) with an additional action. If the user makes a mistake or changes his/her mind, the user may simply repeat the action over the toggled hours in order to switch their state (e.g., switch their state to "not selected").

As used herein, a "user" can be an individual person, a group of people (e.g., an organization) that share a computing resource, such as a family that shares a personal computer or employees of a small business that share a server computer, or a computing resource, such as a personal computer or a cluster of computers. As used herein, a "cursor" can be an icon displayed for a user on a display device to indicate a current position on the display device, based on an input. For example, the user may manipulate a mouse device to input control of movement of the cursor.

As used herein, a "mouse" can be a physical input device that communicates with a system to provide input from a user of the system. For example, the input may include movement or other control signals (e.g., depression of one or more buttons, releasing of a depressed button, etc.). As used herein, a "modifier key" can be a key (other than a mouse "click" button) provided on an input device such as a keyboard (e.g., keyboard 930 as shown in FIG. 9), that may be used by a user to complement other input to a device to achieve enhanced operations. For example, a user may conventionally select an area of a display by using a mouse to move a cursor to a particular location on a display area, and may then depress a mouse button and simultaneously depress a modifier key such as a SHIFT or Control (Ctrl) key on a keyboard to select a displayed object, and may then move the mouse to different locations to select other objects while holding down the SHIFT or Ctrl key. Using conventional mouse techniques, if the user clicks the mouse again without depressing the modifier key, all selected objects may be de-selected. Thus, the user may need to select groups of objects by selecting individual ones of the objects, which may become time-consuming for large numbers of objects.

As used herein, a "modifier input" can be an input from a modifier key or any other type of input additional to a single-action input (e.g., a click, a touch, a contact, a drag, a release) by a user that may be interpreted as an enhanced input to a receiving device, for example, to request processing other than an expected processing resulting from the single-action input. As used herein, a "single-action" input can be an input that does not include a modifier input (e.g., SHIFT key, Alt key). For example, a click with no modifier input may be a single-action input, since it involves only the single click action by a user. For example, a release of a user contact with no modifier input may be a single-action input, since it involves only the single release action by a user, with no modifier input. For example, a drag operation with no modifier input may be a single-action input, since it involves only the single drag action by a user, with no modifier input.

Thus, example techniques are provided herein relating to selecting and toggling objects via an interface based on a click, touch, contact, drag, and/or release operations of a user device such as a mouse or touch device, using no additional modifier input such as modifier keys.

Figure 1:
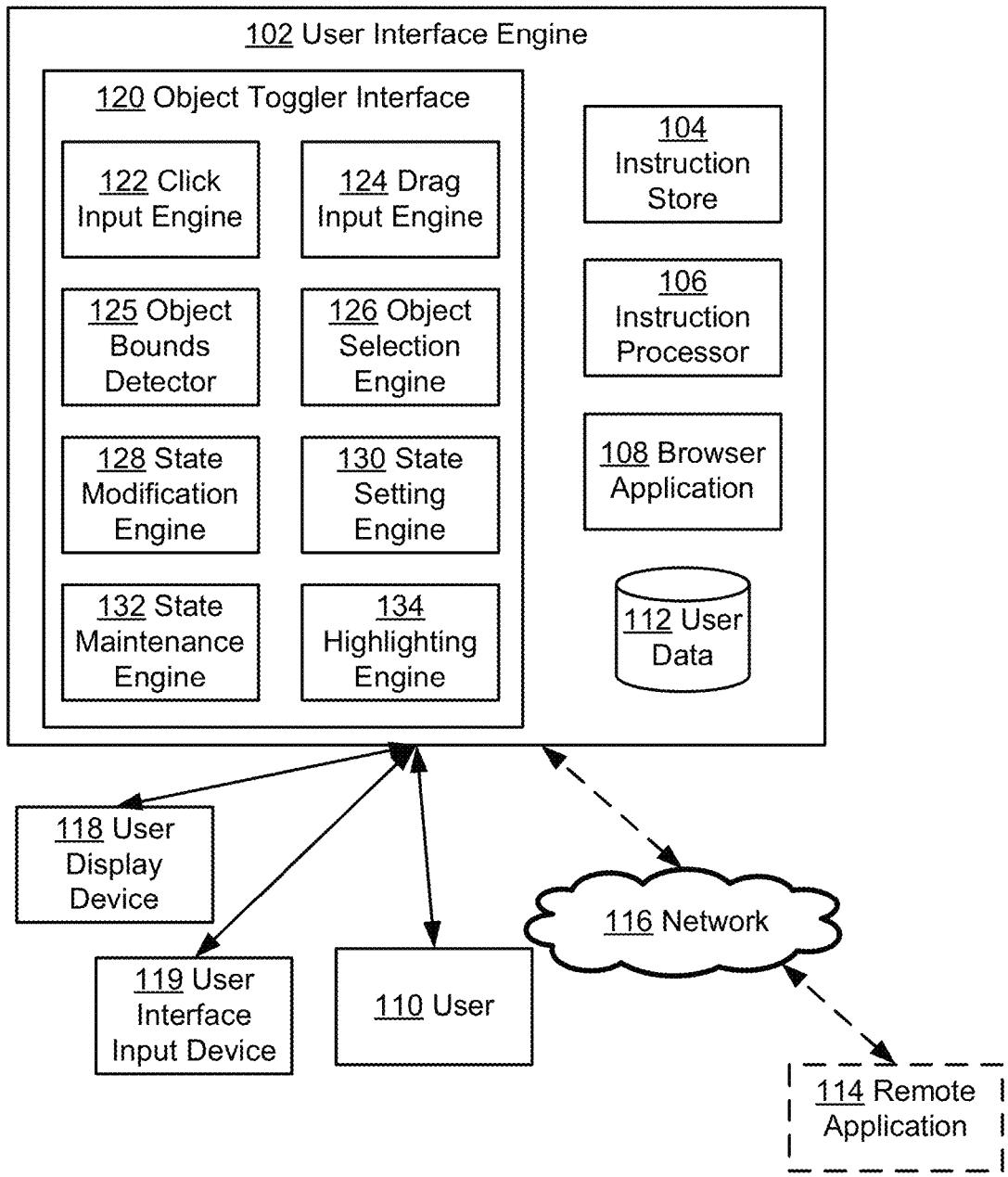
FIG. 1 is a block diagram of an example system including an interface for toggling objects.

Referring to FIG. 1, an example block diagram of an example toggling interface system 100 is illustrated. In one example implementation, the system 100 may include a user interface engine 102 that may include one or more instruction stores 104 for storing machine-executable instructions configured to cause one or more machines or devices to perform example techniques as discussed herein. The instruction store 104 may include a memory or machine-readable storage medium, as discussed further below. The user interface engine 102 may include one or more instruction processors 106 for executing instructions, for example, for executing instructions stored in the instruction store 104, such as the machine-executable instructions, as discussed further below.

The user interface engine 102 may include a browser 108 for use by a user 110. For example, the browser 108 may include a web browser such as Microsoft's Internet Explorer, Mozilla Firefox, Safari, Netscape, Google's Chrome, or AOL Explorer. In an example implementation, the browser 108 may be used to access the World Wide Web, or it may be used to access information provided by servers in private networks or content in a file system.

The user interface engine 102 may include a user data storage area 112 configured to store user data, and the user interface engine 102 may communicate with a remote application 114 via a network 116. For example, the remote application 114 may include one or more applications hosted by one or more servers, or a remote controller application. The network 116 may include any type of wired and/or wireless communication network such as, for example, the Internet, a cellular network, a messaging network, a local network, or any other type of communication network. The user 110 may also communicate with the user interface engine 102 directly or via the network 116 for example, via a computer, a cellular phone, a mobile computing device, a personal digital assistant (PDA) or other computing and/or phone or other communication type device. The user interface engine 102 may also be configured to display information for the user 110 via a user display device 118, and to receive input from the user via a user interface input device 119, as discussed further below.

The user interface engine 102 may include an object toggler interface 120 that includes a click input engine 122 configured to receive a first single-action input from a user indicating a first start tracking request and including information identifying a first current location of a user-controlled object on a user display device, at a time when the user-controlled object is located at the first current location and the user initiates the first start tracking request. In an example implementation, the click input engine 122 may be configured to receive the first single-action input from the user based on receiving a first indication of a depression of a button on a user interface input device. For example, the click input engine 122 may receive the first indication of a depression of a button on a mouse device, a trackball device, or a touchpad device. For example, the user 110 may manipulate the input device 119 (e.g., a mouse device) to move the user-controlled object (e.g., a cursor) to an area on the display device 118 that is associated with an icon displayed as a box that is associated with a display object that the user wishes to select. For example, the user 110 may move the user-controlled object (e.g., a cursor) via a mouse over the box on the display device 119 and then may depress a button on the mouse.

In an example implementation, the click input engine 122 may be configured to receive the first single-action input from the user based on receiving a first indication of a contact with a display screen of the user display device. For example, the user 110 may touch the user's finger or a stylus to a touchscreen on a user display device.

The object toggler interface 120 may include a drag input engine 124 configured to receive a second single-action input from the user indicating a movement of the user-controlled object across the user display device to a first different location on the user display device and including a first stop tracking request at a time when the user-controlled object is located at the first different location and the user initiates the first stop tracking request. In an example implementation, the drag input engine 124 may be configured to receive the second single-action input from the user based on a second indication of a drag operation of a user interface input device, the first stop tracking request indicating a release of a contact with the user interface input device, with no input associated with a modifier input. For example, after the user 110 has depressed a mouse button as discussed above, the user 110 may then move a cursor (e.g., via the mouse), while still depressing the mouse button, to a different location on the display device 119, and may then release the button. For example, the different location may be associated with a second icon displayed as a second box that is associated with a second object that the user 110 wishes to select. For example, the user 110 may move the cursor (e.g., via the mouse) to a location that is over the second box on the display device 119, and may then release the depressed button on the mouse.

For example, the user 110 may touch an object such as the user's finger or a stylus to a touchscreen, and may move the finger or stylus to a different location on the touchscreen while continuing contact with the touchscreen, releasing the contact after the finger or stylus is located at the different location on the touchscreen.

The object toggler interface 120 may include an object bounds detector 125 configured to determine a first display object associated with the first current location and a second display object associated with the first different location.

The object toggler interface 120 may include an object selection engine 126 configured to determine a group of selected display objects including the first and second display objects, and display objects associated with locations displayed in an area of the user display device spanning a first region located between the first current location and the first different location, a selection of the selected display objects based on the first start tracking request and the first stop tracking request, with no input associated with a modifier input. In an example implementation, the object selection engine 126 may be configured to determine the group of selected display objects including the first and second display objects based on determining, by an application running in a web browser, the group of selected display objects including the first and second display objects, and display objects associated with locations displayed in an area of the user display device spanning a first region located between the first current location and the first different location and interior to a web browser window, the selection of the selected display objects based on the first start tracking request and the first stop tracking request, and the determining of the first and second display objects, with no input associated with a modifier input. For example, the user 110 may select the first box and the second box, and any boxes that may be located in an area on the display device 119 between the first box and the second box, based on the example mouse manipulations or finger or stylus manipulations discussed above. In an example implementation, the display objects may be associated with multiple states, for example, states that may be set by looping through cyclic values for changes of state.

The object toggler interface 120 may include a state modification engine 128 configured to modify a first current state of the first display object to a first different state, after the group is determined. In an example implementation, the state modification engine 128 may be configured to modify the first current state of the first display object to the first different state based on toggling the first current state of the first display object to the first different state, after the group is determined. For example, the boxes that are selected by the example mouse manipulations discussed above may be modified to have a state that is the modified (i.e., different) state of the initially selected display object (e.g., the modified state of the first box for this example).

In an example implementation, the state modification engine 128 may be configured to modify the first current state of the first display object to the first different state based on toggling a first current binary state of the first display object to a first different binary state, after the group is determined. For example, the display objects may be toggled between an "off" state and an "on" state, or between a "checked" state and an "unchecked" state, or between a "selected" state and an "unselected" state.

In an example implementation, the state modification engine 128 may be configured to perform one of displaying a check mark in a box representing the first display object or displaying an un-checked box representing the first display object, after determining the group.

The object toggler interface 120 may include a state setting engine 130 configured to set states associated with the selected display objects included in the determined group, other than the first display object.

The click input engine 122 may be configured to receive a third single-action input from the user indicating a second start tracking request and including information identifying a second current location of the user-controlled object on the user display device, at a time when the user-controlled object is located at the second current location and the user initiates the second start tracking request, after the first current state is modified. The object bounds detector 125 may be configured to determine a third display object associated with the second current location, with no input associated with a modifier input, wherein the third display object is different from the first display object and the receipt of the second start tracking request does not initiate further processing of the modified state of the first display object. For example, the second start tracking request (e.g., via a second depression of a mouse button) may not operate to de-select any previously selected display objects (other than potentially the third display object).

In an example implementation, the state setting engine 130 may be configured to set states associated with the selected display objects included in the determined group, other than the first display object, based on setting the states associated with the selected display objects included in the determined group, other than the first object, to the first different state. For example, after modifying a state of the first selected display object from "unselected" to "selected," the state setting engine 130 may set the state of all other selected display objects to a "selected" state, regardless of their initial state at the time of their selection.

In an example implementation, the state setting engine 130 may be configured to set states associated with the selected display objects included in the determined group, other than the first display object, based on performing the following: for each of the selected display objects included in the determined group, other than the first display object, modifying the state of the each display object to a state that is different from a state that is associated with the each display object at the time of determining the group. For example, when modifying a state of the first selected display object from "unselected" to "selected," the state setting engine 130 may set the state of all other selected display objects to a state that is different from the state of the display object being set, at the time of determining the group.

In an example implementation, the state setting engine 130 may be configured to display boxes representing the selected display objects in accordance with a same check mark status of the displayed box representing the first object after modifying the first current state.

In an example implementation, the drag input engine 124 may be configured to receive a fourth single-action input from the user indicating a movement of the user-controlled object across the user display device to a second different location on the user display device and including a second stop tracking request at a time when the user-controlled object is located at the second different location and the user initiates the second stop tracking request. The object bounds detector 125 may be configured to determine a fourth display object associated with the second different location. The object selection engine 126 may be configured to determine another group of selected display objects including the third and fourth display objects, and display objects associated with locations displayed in an area of the user display device spanning a second region located between the second current location and the second different location, a selection of the another group of selected display objects based on the second start tracking request and the second stop tracking request, with no input associated with a modifier input. The state modification engine 128 may be configured to modify a second current state of the third display object to a second different state, after determining the another group, and the state setting engine 130 may be configured to set states associated with the another group of selected display objects in the determined another group, other than the third display object.

The object toggler interface 120 may further include a state maintenance engine 132 configured to maintain the states of display objects associated with locations displayed in an area of the user display device spanning regions external to the second region, while the state modification engine 128 modifies the second current state of the third display object and the state setting engine 130 sets states associated with the another group of selected display objects, other than the third display object.

In an example implementation, the group of selected display objects may include a group of selected options icons. For example, the group may include a group of check boxes or radio buttons that may provide for a user selection options such as "checked" or "unchecked," or "selected" or "unselected."

In an example implementation, the object toggler interface 120 may include a highlighting engine 134 configured to modify an appearance to the user of an area of the user display device spanning a first moving region located between the first current location and a moving location of the user-controlled object during movement to the first different location, indicating a first highlighted state of display objects displayed in the first moving region, while the user-controlled object is moving to the first different location.

Other features and functionalities of the components illustrated in FIG. 1 are described in more detail below with respect to FIGS. 2-9.

Referring to FIG. 2, a process 200 for toggling display objects is illustrated. Process 200 may include receiving a first single-action input from a user indicating a first start tracking request and including information identifying a first current location of a user-controlled object on a user display device, at a time when the user-controlled object is located at the first current location and the user initiates the first start tracking request (210). For example, the click input engine 122 may receive the first single-action input from the user 110, as discussed above.

In one example implementation, the first single-action input from the user may include a first indication of a depression of a button on a user interface input device. In one example implementation, the user interface input device may include a mouse device, a touchpad device, or trackball device. For example, an indication of a user's depression of a mouse button may be received. For example, the information may identify a display object such as a displayed icon (e.g., a displayed box, button, pixel, etc.) and information regarding the location of a cursor (e.g., a pointer) at the time of the user's depression of the mouse button.

In one example implementation, the first single-action input from the user may include a first indication of a contact with a display screen of the user display device. For example, the user 110 may touch the user's finger or a stylus to a touchscreen of a user display device. For example, a laser may penetrate a display screen of a user display device. For example, a user may blow air that may cause a contact with a display screen of a user display device.

The method may include receiving a second single-action input from the user indicating a movement of the user-controlled object across the user display device to a first different location on the user display device and including a first stop tracking request at a time when the user-controlled object is located at the first different location and the user initiates the first stop tracking request (220). For example, the drag input engine 124 may receive the second single-action input from the user, as discussed above.

In one example implementation, receiving the second single-action input from the user may include receiving a second indication of a drag operation of a user interface input device, the first stop tracking request indicating a release of a contact with the user interface input device, with no input associated with a modifier input. For example, the user 110 may drag a mouse with an already-depressed button, or may drag a finger or stylus across a touchscreen, and may then release contact, with no additional modifier input such as a modifier key input (e.g., SHIFT key or Alt key).

The method may include determining a first display object associated with the first current location and a second display object associated with the first different location (230). For example, the object bounds detector 125 may determine the first display object associated with the first current location and the second display object associated with the first different location, as discussed above.

The method may include determining a group of selected display objects including the first and second display objects, and display objects associated with locations displayed in an area of the user display device spanning a first region located between the first current location and the first different location, a selection of the selected display objects based on the first start tracking request and the first stop tracking request, with no input associated with a modifier input (240). For example, the object selection engine 126 may determine the group of selected display objects, as discussed above.

In one example implementation, determining the group of selected display objects including the first and second display objects may include determining, by an application running in a web browser, the group of selected display objects including the first and second display objects, and objects associated with locations displayed in an area of the user display device spanning a first region located between the first current location and the first different location and interior to a web browser window, the selection of the selected display objects based on the first start tracking request and the first stop tracking request, with no input associated with a modifier input.

A first current state of the first display object may be modified to a first different state, after determining the group (250). For example, the state modification engine 128 may modify the first current state of the first display object to a first different state, as discussed above. In one example implementation, the first current state of the first display object may be toggled to the first different state. In one example implementation, a current binary state of the first display object may be toggled to a first different binary state.

The example method may include setting states associated with the selected display objects included in the determined group, other than the first display object (260). For example, the state setting engine 130 may set states associated with the selected display objects included in the determined group, other than the first display object, as discussed above.

In one example implementation, setting the state associated with the selected objects, other than the first object, may include setting the state associated with the selected objects, other than the first object, to the first different state. In one example implementation, setting the state associated with the selected objects, other than the first object, may include, for each of the selected objects, other than the first object, modifying the state of the each object to a state that is different from a state associated with the each object at the time of determining the group.

The method may include receiving a third single-action input from the user indicating a second start tracking request and including information identifying a second current location of the user-controlled object on the user display device, at a time when the user-controlled object is located at the second current location and the user initiates the second start tracking request, after the modifying the first current state (270). For example, the click input engine 122 may receive the third single-action input from the user indicating a second start tracking request and including information identifying a second current location of the user-controlled object on the user display device, at a time when the user-controlled object is located at the second current location and the user initiates the second start tracking request, after the modifying the first current state, as discussed above.

The method may include determining a third display object associated with the second current location, with no input associated with a modifier input, wherein the third display object is different from the first display object and the receipt of the second start tracking request does not initiate further processing of the modified state of the first display object (280). For example, the object bounds detector 125 may determine the third display object associated with the second current location, as discussed above.

In an example implementation, the method may further include receiving a fourth single-action input from the user indicating a movement of the user-controlled object across the user display device to a second different location on the user display device and including a second stop tracking request at a time when the user-controlled object is located at the second different location and the user initiates the second stop tracking request. A fourth display object associated with the second different location may be determined. Another group of selected display objects may be determined, the another group including the third and fourth display objects, and display objects associated with locations displayed in an area of the user display device spanning a second region located between the second current location and the second different location, a selection of the another group of selected display objects based on the second start tracking request and the second stop tracking request, with no input associated with a modifier input. While maintaining the states of display objects associated with locations displayed in an area of the user display device spanning regions of the user display device external to the second region, a second current state of the third display object may be modified to a second different state, and states associated with the another group of selected display objects in the determined another group, other than the third display object, may be set.

In an example implementation, the method may include modifying an appearance to the user of the area of the user display device spanning the first region located between the current location and the different location, the modified appearance indicating a selected state of objects displayed in the area of the user display device spanning the first region located between the current location and the different location.

In an example implementation, the group of selected objects may include a group of selected options icons.

In an example implementation, modifying the first current state of the first display object to the first different state may include one of displaying a check mark in a box representing the first display object or displaying an un-checked box representing the first display object, after determining the group. In an example implementation, setting the states associated with the selected display objects included in the determined group, other than the first display object may include displaying boxes representing the selected display objects in accordance with a same check mark status of the displayed box representing the first object after modifying the first current state.

Referring to FIGS. 3a-3c, screen shots 300 of example object toggling operations are illustrated. As shown in FIG. 3a, a one-dimensional user interface application displays a one-dimensional list of display objects that may be of interest to a user. As shown, the application displays a list of display objects that include icons that may be selected (e.g., check boxes). One skilled in the art of data processing will appreciate that there are many types of applications supporting selection of display objects by a user. For example, a user may select one or more display objects for deletion, copying, movement, or download. For example, a user of an email application may select one or more messages for deletion or for copying or movement to a folder.

As shown in FIG. 3a, a user may use an input device such as a mouse to move a cursor 302 (e.g., displayed as an arrow or a hand) to an area of a display such as a box for selection. The box may be associated with an object such as an email message. As shown in FIG. 3a, by manually manipulating a mouse, the user may cause the cursor 302 to be moved on the display to an area associated with an object "Northwest Airlines." While the cursor is positioned at this location, the user may depress a button on the mouse (i.e., providing a single-action input) to begin a selection operation (e.g., a "drag and drop" operation). An area 304 on the display is shown with three objects already selected (i.e., boxes already checked). Thus, display objects associated with the display area 304 are currently in a selected state, and display objects displayed in FIG. 3a other than in area 304 are currently in an unselected state (e.g., with regard to their display).

As shown, the depression of the mouse button over the area associated with "Northwest Airlines" does not cause the boxes in area 304 to be de-selected. Further, the user does not need to depress any additional keys (e.g., modifier keys) in order to select further objects on the display. For example, the user does not need to additionally depress a SHIFT key or a CONTROL (Ctrl) key in order to select objects in addition to the objects already selected in the area 304.

While depressing the button on the mouse (and no additional depressed buttons, i.e., providing a single-action input), the user may move the mouse to cause the cursor 302 to move in a downward direction on the display to a location associated with an object displayed as "Southwest Airlines" on the display. The user may move the mouse in directions other than straight down (e.g., upward, downward, or sideways, or a combination thereof) before the cursor 302 arrives at the "Southwest Airlines" object on the display. At this point, an area 306 on the display (e.g., an area between the objects "Northwest Airlines" and "Southwest Airlines") may appear as a highlighted area. As shown in FIG. 3c, the user may release the mouse button (i.e., providing a single-action input), causing icons such as boxes displayed in the display area 306 to appear as checked boxes. Thus, the objects associated with the checked boxes may have their states modified from an unselected state to a selected state by the "drag and drop" operation of the mouse by the user. The boxes in the area 304 remain checked, and thus, the objects associated with the checked boxes displayed in area 304 maintain a selected state. The highlighting appears as the cursor 302 is moved on the display, whether the movement is upward, downward, sideways, or a combination thereof.

Referring to FIGS. 4a-4c, further screen shots 400 of example object toggling operations are illustrated. As shown in FIG. 4a, the display areas 304 and 306 discussed above may continue to display their associated objects in a selected state while the user may manipulate the mouse device to cause the cursor 302 to move to an area on the display associated with an object displayed as "Netflix Shipping," which may be more particularly identified as a second "Netflix Shipping" message that indicates "The Chronicles of Narnia" in its subject line. Again, the user may depress the mouse button while the cursor 302 is positioned on the display area over the area associated with the second "Netflix Shipping" object (i.e., providing a single-action input), and may "drag" the cursor 302 (i.e., move the mouse to cause the cursor to move while the button remains depressed) in a downward direction (upward, downward, or sideways, or a combination thereof), to an area on the display associated with an object displayed as "Pacific Utilities." Again, the user may move the mouse with the mouse button depressed, while depressing no other buttons (i.e., no depression of any modification keys), for example, as a "drag and drop" operation, to move the mouse to cover an area 402, that includes a display area between the second "Netflix Shipping" object and the "Pacific Utilities" object. As shown in FIG. 4b, the area 402 may then appear as a highlighted area 402. As shown in FIG. 4c, the user may then release the depressed mouse button while the cursor 302 is positioned on the display over the object associated with the display area shown as "Pacific Utilities" (i.e., providing a single-action input), and the second "Netflix Shipping" object may be modified from an unselected state to a selected state, and objects associated with the area displayed on the display between the second "Netflix Shipping" object and the "Pacific Utilities" object, may be set to the same state as the second "Netflix Shipping" object (i.e., to a selected state in this example). The boxes associated with these objects are thus shown as checked boxes within the display area 402.

FIGS. 5a-5h illustrate screen shots 500 of further example object toggling operations, more particularly showing selections of discontinuous display areas. As shown in FIG. 5a, the user may use the user-controlled object (e.g., a pointer device or manual input device such as the mouse) to move the cursor 302 to a box for selection. As shown in FIG. 5a, by manually manipulating the mouse, the user may cause the cursor 302 to be moved on the display to an area associated with an object "Bill Richards." While the cursor is positioned at this location, the user may again depress the button on the mouse to begin a selection operation (i.e., providing a single-action input). As shown in FIG. 5a, objects associated with the area shown in the display area 500 are shown as unselected. As shown in FIG. 5b, the user may continue depressing the mouse button, while depressing no other buttons (i.e., no depression of any modification keys), for example, as a "drag and drop" operation, to move the mouse to cover an area 502, that includes a display area between the "Bill Richards" object and an "Apple" object. As shown in FIG. 5b, the area 502 may then appear as a highlighted area 502. As shown in FIG. 5c, the user may then release the depressed mouse button while the cursor 302 is positioned on the display over the object associated with the display area shown as "Apple" (i.e., providing a single-action input) and the "Bill Richards" object may be modified from an unselected state to a selected state, and objects associated with the area displayed on the display between the "Bill Richards" object and the "Apple" object, may be set to the same state as the "Bill Richards" object (i.e., set to a selected state in this example). The boxes associated with these objects are thus shown as checked boxes within the display area 502.

As shown in FIG. 5c, the user may use the mouse to move the cursor 302 to a box associated with a second "Jane Smith" message for selection. As shown in FIG. 5c, the second "Jane Smith" message is displayed within the display area 502 that was previously selected by the user. In this example, the user may wish to maintain the selected state of some of the objects displayed in the area 502, while de-selecting a subgroup of objects displayed within the area 502.

While the cursor is positioned at the display location associated with the second "Jane Smith" message, the user may again depress the button on the mouse to begin a selection operation (i.e., providing a single-action input). As shown in FIG. 5c, objects associated with the area shown in the display area 502 continue to be shown as selected. As shown in FIG. 5d, the user may continue depressing the mouse button, while depressing no other buttons (i.e., no depression of any modification keys), to move the mouse to cover an area 504, that includes a display area between the second "Jane Smith" object and a "Citibank" object (i.e., providing a single-action input). As shown in FIG. 5d, the area 504 may then appear as a highlighted area 504, distinguishing the area 504 from the surrounding display area 502 that is external to the area 504. As shown in FIG. 5e, the user may then release the depressed mouse button while the cursor 302 is positioned on the display over the object associated with the display area shown as "Citibank" (i.e., providing a single-action input), and the second "Jane Smith" object may be modified from a selected state to an unselected state, and objects associated with the area displayed on the display between the second "Jane Smith" object and the "Citibank" object, may be set to the same state as the second "Jane Smith" object (i.e., set to an unselected state in this example). The boxes associated with these objects are thus shown as unchecked boxes within the display area 504. The boxes associated with the objects associated with the display area 502 that are external to the display area 504 continue to be displayed with checked boxes, as their states are not modified by the operations on the objects associated with the area within the display area 504.

At this point, the user may decide to select the objects displayed on the display area 500 between the second "Jane Smith" display object and a "Bob Smith" display object. The user may thus use the mouse to move the cursor 302 to the box associated with the second "Jane Smith" message for selection, as shown in FIG. 5f. As shown in FIG. 5f, the second "Jane Smith" message is displayed within the display areas 502 and 504 that were previously selected by the user.

While the cursor 302 is positioned at the display location associated with the second "Jane Smith" message, the user may again depress the button on the mouse to begin a selection operation (i.e., providing a single-action input). As shown in FIG. 5f, display objects shown in FIG. 5e maintain the states as determined and shown in FIG. 5e, as discussed above. As shown in FIG. 5g, the user may continue depressing the mouse button, while depressing no other buttons (i.e., no depression of any modification keys, i.e., providing a single-action input), to move the mouse to cover an area 506, that includes a display area between the second "Jane Smith" object and the "Bob Smith" object. As shown in FIG. 5g, the area 506 may then appear as a highlighted area 506, distinguishing the area 506 from the adjacent display area 502 that is external to the area 506. As shown in FIG. 5h, the user may then release the depressed mouse button while the cursor 302 is positioned on the display over the object associated with the display area shown as "Bob Smith," and the second "Jane Smith" object may be modified from an unselected state to a selected state, and objects associated with the area displayed on the display between the second "Jane Smith" object and the "Bob Smith" object, may be set to the same state as the second "Jane Smith" object (i.e., set to a selected state in this example). The boxes associated with these objects are thus shown as checked boxes within the display area 506. The boxes associated with the objects associated with the display area 502 that are external to the display area 506 continue to be displayed with checked boxes, as their states are not modified by the operations on the objects associated with the area within the display area 506. Boxes displayed within the display area 506 that were previously displayed as checked boxes in FIG. 5f, are set to a selected state, and continue to be displayed as checked boxes (i.e., boxes associated with the "Southwest Airlines" message, first and second "Netflix Shipping" messages, and the "Apple" message in this example).

FIG. 6 illustrates a screen shot 600 of an example two-dimensional user application. Examples of two-dimensional user applications may include spreadsheets, calendars, tables, and other types of scheduling applications. As shown in FIG. 6, a user may wish to display and select various hours of the day over the days of a week. For example, the user may wish to schedule blocks of time for certain events by selecting blocks of hours over days in the week. For example, if the user wishes to schedule a time for system backup at times that do not interfere with other scheduled activities, the user may wish to select discontinuous blocks of time and set those blocks to a busy state, or an unavailable state.

Figures 7A, 7B:
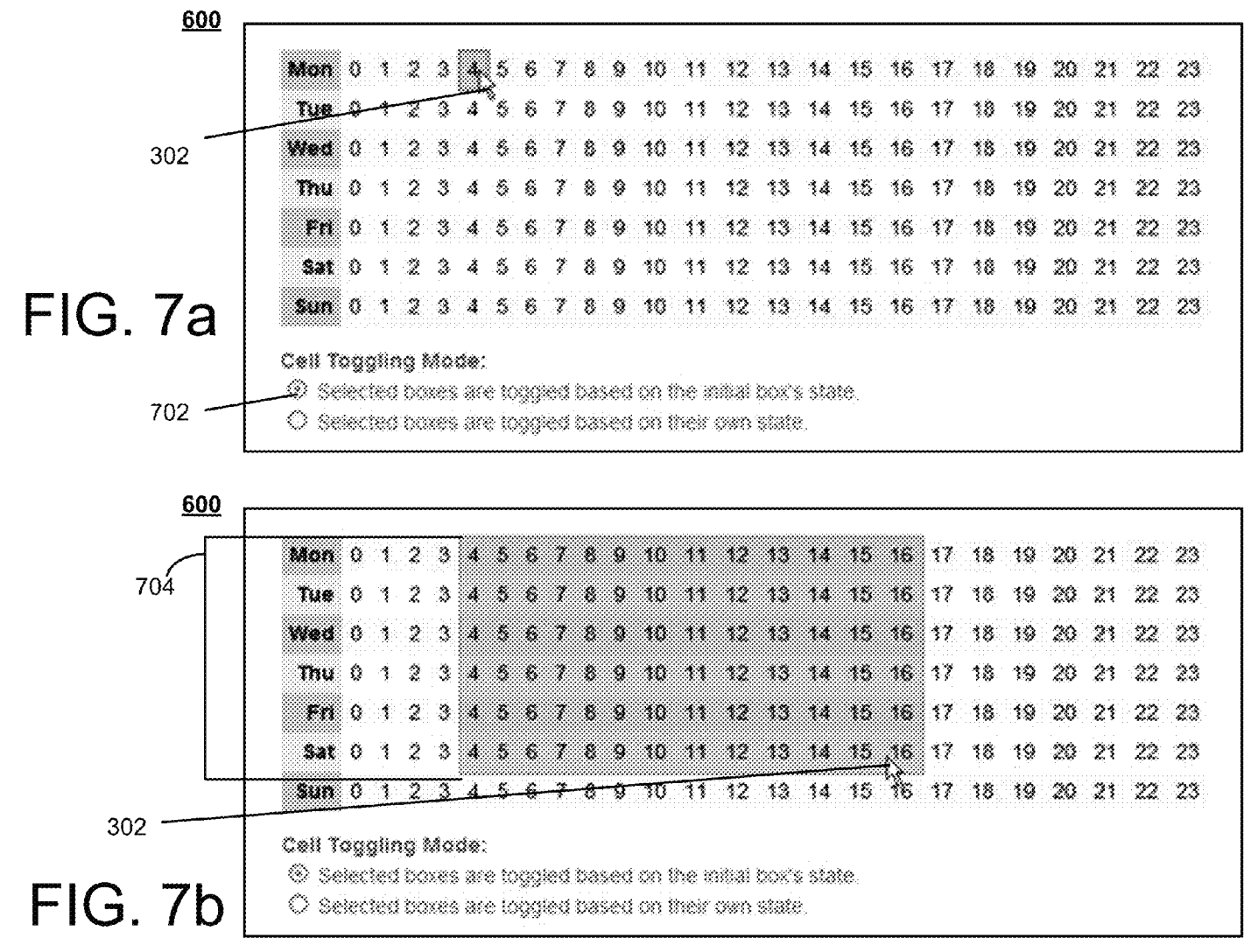

FIGS. 7a-7d illustrate screen shots 600 of example object toggling operations based on the example two-dimensional user application of FIG. 6. As shown in FIGS. 7a-7d, the user may wish to select times indicated as "4" and "16" for Monday through Saturday, and additionally times indicated as "5" through "15" for Monday. Using conventional techniques, the user might manipulate the mouse in combination with a modifier key such as a SHIFT key or Ctrl key on a keyboard to individually select each of the cells for these times on the display. However, by using the techniques discussed herein, the user may use the mouse to move the cursor 302 to the box associated with a cell associated with "4" on a row associated with "Monday" for selection, as shown in FIG. 7a. As shown in FIG. 7a, a toggling mode made be selected for this example as a mode 702 indicating "selected boxes are toggled based on the initial box's state." Thus, if the first box or cell to be selected by the user has an initial state of "selected" then a selected area of boxes will be toggled to an unselected state, such that the initial selected box will experience a change in state, and all other boxes selected with the initial selected box will be set to the same state as the changed, or modified, state of the initial selected box.

Figures 7C, 7D:
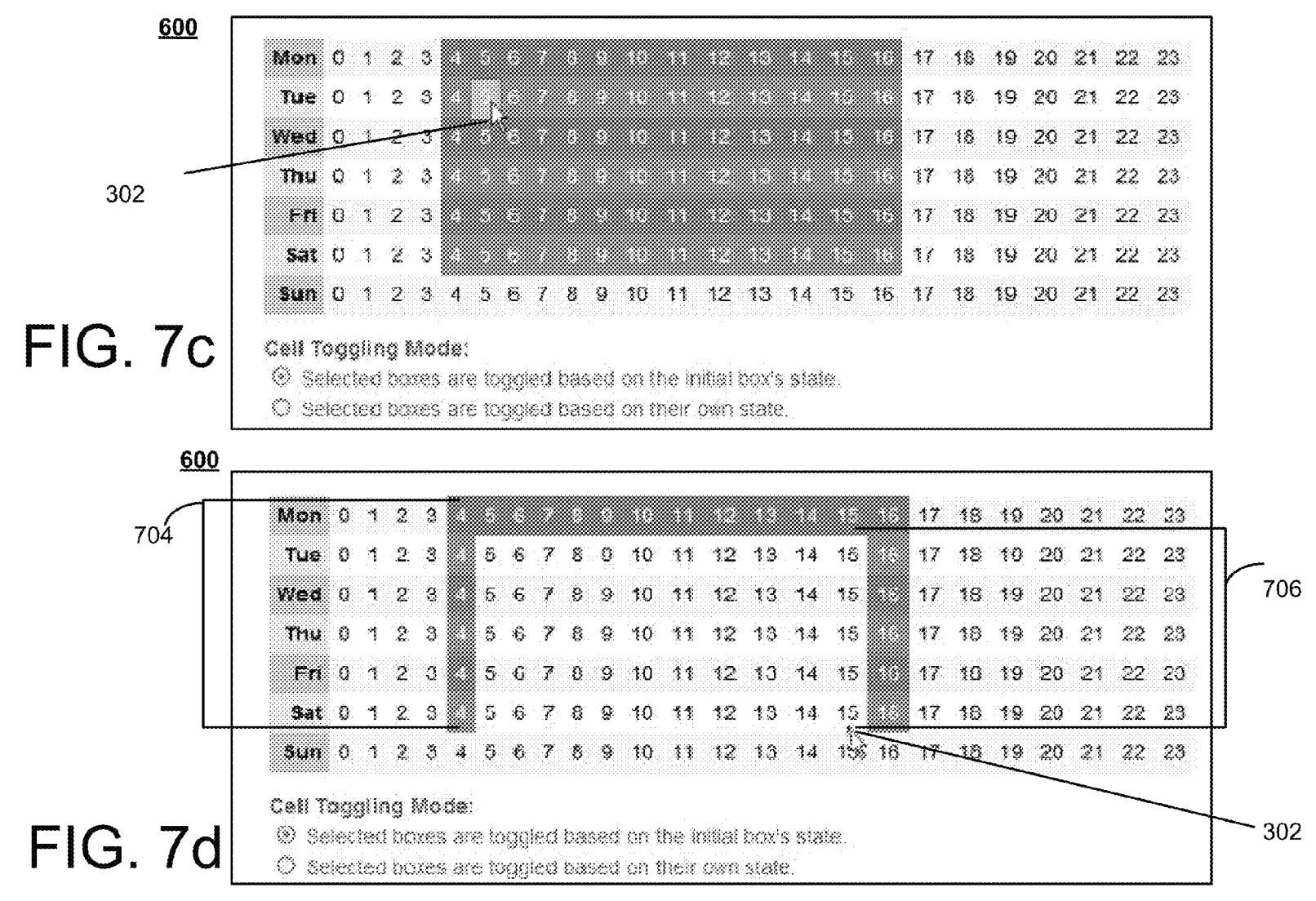

As shown in FIG. 7a, the user may manipulate the mouse to position the cursor 302 in an area on the display 600 associated with "4" on the row associated with "Monday." While the cursor is positioned at the display location associated with the "4" on the row associated with "Monday," the user may depress the button on the mouse to begin a selection operation (e.g., via a start tracking request). As shown in FIG. 7b, the user may continue depressing the mouse button, while depressing no other buttons (i.e., no depression of any modification keys), to move the mouse to cover an area 704, that includes a display area between the "4" on the row associated with "Monday" and "16" on a row associated with "Saturday." As shown in FIG. 7b, the area 704 may then appear as a highlighted area 704, distinguishing the area 704 from the adjacent display area that is external to the area 704. As shown in FIG. 7b, the user may then release the depressed mouse button (e.g., a stop tracking request) while the cursor 302 is positioned on the display over the "16" on a row associated with "Saturday," and the "4" on the row associated with "Monday" may be modified from an unselected state to a selected state, and objects associated with the area displayed on the display between the "4" on the row associated with "Monday" and the "16" on a row associated with "Saturday," may be set to the same state as the "4" on the row associated with "Monday" (i.e., set to a selected state in this example). The cells associated with these objects are thus shown as dark highlighted cells within the display area 704, as shown in FIG. 7c. The cells associated with the objects associated with the display area that are external to the display area 704 continue to be displayed with no highlighting, as their states are not modified by the operations on the objects associated with the area within the display area 704.

As shown in FIG. 7c, the user may then manipulate the mouse to move the cursor 302 to an area of the display that is associated with a "5" on a row associated with "Tuesday" and may depress the mouse button (e.g., a start tracking request). As shown in FIG. 7d, the user may continue depressing the mouse button, while depressing no other buttons (i.e., no depression of any modification keys), to move the mouse to cover an area 706, that includes a display area between the "5" on the row associated with "Tuesday" and "15" on the row associated with "Saturday." As shown in FIG. 7d, the area 706 may appear as a differently highlighted area 706, distinguishing the area 706 from the adjacent display area 704 that is external to the area 706. As shown in FIG. 7d, the user may then release the depressed mouse button (e.g., a stop tracking request) while the cursor 302 is positioned on the display over the "15" on the row associated with "Saturday," and the "5" on the row associated with "Tuesday" may be modified from a selected state to an unselected state, and objects associated with the area displayed on the display between the "5" on the row associated with "Tuesday" and the "15" on the row associated with "Saturday," may be set to the same state as the "5" on the row associated with "Tuesday" (i.e., set to an unselected state in this example).

Figure 8A:
Figures 8B, 8C:
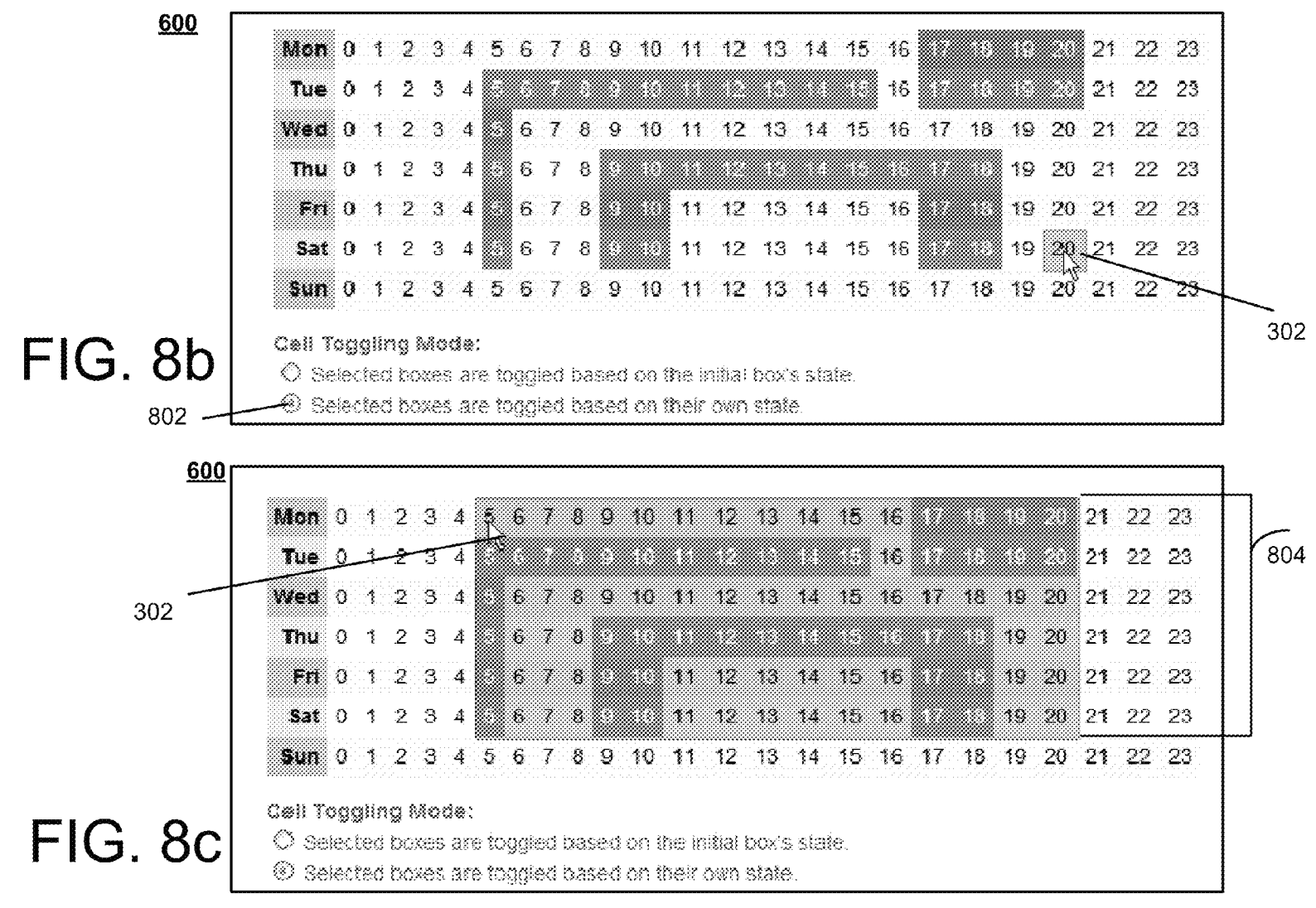

FIGS. 8a-8d illustrate screen shots 600 of example object toggling operations based on the example two-dimensional user application of FIG. 6. As shown in FIGS. 8a-8d, the user may wish to select times in discontinuous blocks, and may then wish to toggle blocks of the selected cells to states that are different from each cell's current state. Thus, as shown in FIG. 8a, the display area is shown with discontinuous blocks of selected cells. As shown in FIG. 8b, the user may select a mode 802 indicating "selected boxes are toggled based on their own state." Thus, if the user selects a group of objects (e.g., boxes or cells), then each object may change state in accordance with its own current state at the time of the selection. If an object is selected that already has a selected state, then its state may be toggled to unselected. Further, if an object is selected that already has an unselected state, then its state may be toggled to selected, regardless of the state of an initially selected object in the group of objects.

As shown in FIG. 8b, the user may manipulate the mouse to cause the cursor 302 to move to an area of the display associated with "20" on the row associated with "Saturday." While the cursor is positioned at the display location associated with the "20" on the row associated with "Saturday," the user may depress the button on the mouse to begin a selection operation. As shown in FIGS. 8c-8d, the user may continue depressing the mouse button, while depressing no other buttons (i.e., no depression of any modification keys), to move the mouse to cover an area 804, that includes a display area between the "20" on the row associated with "Saturday" and "4" on the row associated with "Monday." As shown in FIG. 8c, the area 804 may then appear as a highlighted area 804 as the cursor moves through the area 804 toward the "4" on the row associated with "Monday," distinguishing the area 804 from the adjacent display area that is external to the area 804. As shown in FIG. 8d, the user may then release the depressed mouse button while the cursor 302 is positioned on the display over the "4" on the row associated with "Monday," and all objects in the rectangular region of the display bounded by the "4" on the row associated with "Monday," and the "20" on the row associated with "Saturday," are toggled to a different state (i.e., previously selected cells are toggled to an unselected state, and previously unselected cells are toggled to a selected state). Thus, by selecting a block of cells, the user may change the state of all objects within the selected block.

The example techniques discussed herein may provide user interfaces that provide users with ease in selecting groups of objects. More particularly, users may select discontinuous groups of objects with a simple "drag and drop" operation of a handheld device such as a mouse, without any additional input such as a depression of a modifier key (e.g., SHIFT or Ctrl key, etc.) on a keyboard. Using example techniques discussed herein, a user may select multiple groups without deselecting previously selected objects by depressing a button on the mouse in a display area other than areas covering the previously selected objects. The interaction techniques discussed herein may be advantageous for situations in which the objects to be selected cannot move around within a display area, and when the click and drag interaction begins on one of the objects to be toggled. The example techniques discussed herein may also be used in other user display scenarios such as user display devices using touchpads, trackballs, and touchscreens. One skilled in the art of data processing will appreciate that the example techniques discussed herein may also be used in situations involving many other types of user input such as eye movement, speech, breathing, or any other type of input that may provide single-action determination of an initial location, a movement, and a final location determined by the movement, based on a start tracking input and a stop tracking input. While one-dimensional and two-dimensional techniques are discussed herein, one skilled in the art may appreciate that many other types of dimensionality may be included, without departing from the spirit or scope of the discussion herein.

The example techniques discussed herein may provide more efficient applications such as migration of email, web applications, or any type of product or service that may provide for easy discontinuous selection (e.g., toggling) of objects via a user interface such as a graphical user interface.

The example techniques discussed herein may be implemented, for example, via modifications to executable code that interacts with user input device indicators such as a "start tracking" indicator (e.g., a "mouse down" indicator) and a "stop tracking" indicator (e.g., a "mouse up" indicator) that may be received from a user input device interface. For example, an application may be configured to receive a "mouse down" indicator, and to maintain states of objects when a second "mouse down" indicator is received, with no modifier input.

FIG. 9 shows an example of a generic computer device 900 and a generic mobile computer device 950, which may be used with the example techniques discussed herein. Computing device 900 may represent various forms of digital computers, such as laptops, desktops, workstations, personal digital assistants, servers, blade servers, mainframes, and other appropriate computers. Computing device 950 may represent various forms of mobile devices, such as personal digital assistants, cellular telephones, smart phones, and other similar computing devices. The components shown herein, their connections and relationships, and their functions, are presented as examples only, and are not intended to limit implementations of the techniques discussed herein.

As shown in FIG. 9, computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various buses, and may be mounted on a common motherboard or in other configurations as appropriate. The processor 902 can process instructions for execution within the computing device 900, including instructions stored in the memory 904 or on the storage device 906 to display graphical information for a graphical user interface (GUI) on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also embody instructions that, when executed, perform one or more methods, such as those described above. The information carrier may include a computer-readable or machine-readable medium, such as the memory 904, the storage device 906, or memory on processor 902.

The high speed controller 908 may manage bandwidth-intensive operations for the computing device 900, while the low speed controller 912 may manage lower bandwidth-intensive operations, although these are merely examples of allocations. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a display 926, a keyboard 930, a pointing device (e.g., a mouse 932 or mouse 928 having buttons 934, 936), a scanner, or a networking device such as a switch or router, e.g., through a network adapter. For example, the display 916 or display 926 may include a touchscreen input/output interface.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each device may include one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, may be interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may include, for example, a TFT LCD (Thin-Film-Transistor Liquid Crystal Display) or an OLED (Organic Light Emitting Diode) display, or other appropriate display technology. The display interface 956 may include appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used. For example, the display 916, display 926, or display 954 may include a touchscreen input/output interface.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product includes instructions that, when executed, perform one or more methods, such as those described above. The information carrier is a computer-readable or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where desired. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in FIG. 9. For example, it may be implemented as a cellular telephone 980. It may also be implemented as part of a smart phone 982, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device, as discussed above.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, touchpad, or trackball) or an input screen such as a touch screen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A number of embodiments have been described. Nevertheless, it will be understood that various modifications may be made without departing from the spirit and scope of the discussion herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or computer-readable storage medium, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network (e.g., network 116). Examples of communication networks include a local area network (LAN) and a wide area network (WAN), e.g., the Internet. Connections to a network may be accomplished, for example, via a network interface card coupled to a device.

The computing system may include clients and servers. A client and server are generally remote from each other and typically interact through a communication network. The relationship of client and server arises by virtue of computer programs running on the respective computers and having a client-server relationship to each other.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method comprising:
receiving a first one-button input from a user, with no input associated with a modifier input, indicating a first start tracking request and including information identifying first coordinates of a user-controlled object on a user display device, at a time when the user-controlled object is located at the first coordinates and the user initiates the first start tracking request;

receiving a first drag input from the user indicating a movement of the user-controlled object across the user display device to second coordinates on the user display device and including a first stop tracking request at a time when the user-controlled object is located at the second coordinates and the user initiates the first stop tracking request, the first stop tracking request being a release of the button, with no input associated with a modifier input;

determining a first display object associated with the first coordinates and a second display object associated with the second coordinates;

determining a group of selected display objects including the first display object, the second display object, and third display objects, the third display objects being automatically included in the group based on being located in an area of the user display device spanning a first rectangular area defined by the first coordinates and the second coordinates, the determining a group being initiated by the first stop tracking request, the third display objects including display objects in at least two columns;

modifying a first current state of the first display object to a first different state, after determining the group;

using a value selected by the user of a toggle control to set states associated with the selected display objects included in the determined group, other than the first display object, to either the first different state or, for each particular selected display object, a state different than a previous state of the particular selected display object;

receiving a second one-button input from the user, with no input associated with a modifier input, indicating a second start tracking request and including information identifying third coordinates of the user-controlled object on the user display device, at a time when the user-controlled object is located at the third coordinates and the user initiates the second start tracking request, after the modifying the first current state; and determining a fourth display object associated with the third coordinates, wherein the fourth display object is different from the first display object and the modified state of the first display object is maintained upon receipt of the second start tracking request.

2. The computer-implemented method of claim 1 further comprising:

while the user-controlled object is moving to the second coordinates, modifying an appearance to the user of an area of the user display device spanning a first moving region located between the first coordinates and a moving location of the user-controlled object during movement to the second coordinates, indicating a first highlighted state of display objects displayed in the first moving region.

3. The computer-implemented method of claim 1 wherein the one-button input is a contact with a touchpad device.

4. The computer-implemented method of claim 1 wherein the one-button input is associated with one of a mouse device, a touchpad device, or a trackball device.

5. The computer-implemented method of claim 1 wherein modifying the first current state of the first display object to the first different state includes toggling the first current state of the first display object to the first different state, after determining the group.

6. The computer-implemented method of claim 1 wherein modifying the first current state of the first display object to the first different state includes toggling a first current binary state of the first display object to a first different binary state, after determining the group.

7. The computer-implemented method of claim 1 wherein a default value of the toggle control results in setting states associated with the selected display objects included in the determined group, other than the first display object, to the first different state and a non-default value of the toggle control results in setting the state of each particular display object to a state that is different from a state that is associated with the particular display object at the time of determining the group.

8. The computer-implemented method of claim 1 further comprising:

receiving a second drag input from the user indicating a movement of the user-controlled object across the user display device to fourth coordinates on the user display device and including a second stop tracking request at a time when the user-controlled object is located at the fourth coordinates and the user initiates the second stop tracking request;

determining a fifth display object associated with the fourth coordinates;

determining another group of selected display objects including the fourth display object, the fifth display object, and sixth display objects, the sixth display objects being automatically included in the another group based on being located in an area of the user display device spanning a second rectangular region defined by the third coordinates and the fourth coordinates, the determining another group being initiated by the second stop tracking request, with no input associated with a modifier input; and while maintaining the states of display objects associated with locations in an area of the user display device external to the second region, modifying a second current state of the fourth display object to a second different state, after determining the another group, and using the value of the toggle control to set states associated with the another group of selected display objects in the determined another group, other than the fourth display object.

9. The computer-implemented method of claim 1 wherein the group of selected display objects includes a group of selected options icons.

10. The computer-implemented method of claim 1 wherein:

modifying the first current state of the first display object to the first different state includes one of displaying a check mark in a box representing the first display object or displaying an un-checked box representing the first display object, after determining the group, and setting the states associated with the selected display objects included in the determined group, other than the first display object, includes displaying boxes representing the selected display objects in accordance with a same check mark status of the displayed box representing the first object after modifying the first current state.

11. A system comprising:

a user display device;

an instruction store configured to store machine-executable instructions;

an instruction processor configured to execute at least a portion of the machine-executable instructions stored in the instruction store;

an object toggler interface including:

a click input engine configured to receive a first one-button input from a user, with no input associated with a modifier input, indicating a first start tracking request and including information identifying first coordinates of a user-controlled object on the user display device, at a time when the user-controlled object is located at the first coordinates and the user initiates the first start tracking request;

a drag input engine configured to receive a first drag input from the user indicating a movement of the user-controlled object across the user display device to second coordinates on the user display device and including a first stop tracking request at a time when the user-controlled object is located at the second coordinates and the user initiates the first stop tracking request, the first stop tracking request being a release of the one-button input with no input associated with a modifier input;

an object bounds detector configured to determine a first display object associated with the first coordinates and a second display object associated with the second coordinates;

an object selection engine configured to determine a group of selected display objects including the first display object, the second display object, and third display objects, the third display objects being automatically included in the group based on being located in an area of the user display device spanning a first rectangular region defined by the first coordinates and the second coordinates, the determining a group being initiated by the first stop tracking request, the third display objects including display objects in at least two columns;

a state modification engine configured to modify a first current state of the first display object to a first different state, after the group is determined; and a state setting engine configured to using a value selected by the user of a toggle control to set states associated with the selected display objects included in the determined group, other than the first display object, to either the first different state or, for each particular selected display object, a state different than a previous state of the particular selected display object, wherein the click input engine is configured to receive a second one-button input from the user, with no input associated with a modifier input, indicating a second start tracking request and including information identifying third coordinates of the user-controlled object on the user display device, at a time when the user-controlled object is located at the third coordinates and the user initiates the second start tracking request, after the first current state is modified, and the object bounds detector is configured to determine a fourth display object associated with the third coordinates, wherein the fourth display object is different from the first display object and the modified state of the first display object is maintained upon receipt of the second start tracking request.

12. The system of claim 11 further comprising:

a highlighting engine configured to modify an appearance to the user of an area of the user display device spanning a first moving region located between the first coordinates and a moving location of the user-controlled object during movement to the second coordinates, indicating a first highlighted state of display objects displayed in the first moving region, while the user-controlled object is moving to the second coordinates.

13. The system of claim 11 wherein the one-button input is a contact with a touchpad device.

14. The system of claim 11 wherein the state modification engine is configured to receive an indication of whether the selected display objects included in the determined group, other than the first display object, are set based on the state of the first display object or based on their own state as part of setting states associated with the selected display objects included in the determined group, other than the first display object.

15. The system of claim 11 wherein the state modification engine is configured to modify the first current state of the first display object to the first different state based on toggling the first current state of the first display object to the first different state, after the group is determined.

16. The system of claim 11 wherein the state modification engine is configured to modify the first current state of the first display object to the first different state based on toggling a first current binary state of the first display object to a first different binary state, after the group is determined.

17. The system of claim 11 wherein a default value of the toggle control results in the state setting engine setting the states associated with the selected display objects included in the determined group, other than the first object, to the first different state and a non-default value of the toggle control results in the state setting engine setting the state of each particular display object to a state that is different from a state that is associated with the particular display object at the time of determining the group.

18. The system of claim 11 wherein:

the drag input engine is configured to receive a second drag input from the user indicating a movement of the user-controlled object across the user display device to fourth coordinates on the user display device and including a second stop tracking request at a time when the user-controlled object is located at the fourth coordinates and the user initiates the second stop tracking request;

the object bounds detector is configured to determine a fifth display object associated with the fourth coordinates;

the object selection engine configured to determine another group of selected display objects including the fourth display object, the fifth display object, and sixth display objects, the sixth display objects being automatically included in the another group based on being located-in an area of the user display device spanning a second rectangular region defined by the third coordinates and the fourth coordinates, the determining another group being initiated by second stop tracking request, with no input associated with a modifier input;

the state modification engine is configured to modify a second current state of the fourth display object to a second different state, after determining the another group; and the state setting engine is configured to set states associated with the another group of selected display objects in the determined another group, other than the fourth display object, and the object toggler interface further comprises:

a state maintenance engine configured to maintain the states of display objects associated with locations in an area of the user display device external to the second region, while the state modification engine modifies the second current state of the fourth display object and the state setting engine uses the value of the toggle control to set states associated with the another group of selected display objects, other than the fourth display object.

19. A computer program product comprising a non-transitory computer-readable storage medium configured to cause a data processing apparatus to:
receive a first one-button input from a user indicating a first start tracking request and including information identifying first coordinates of a user-controlled object on a user display device, at a time when the user-controlled object is located at the first coordinates and the user initiates the first start tracking request;
receive a drag input from the user indicating a movement of the user-controlled object across the user display device to second coordinates on the user display device and including a first stop tracking request at a time when the user-controlled object is located at the second coordinates and the user initiates the first stop tracking request, the first stop tracking request being a release of the one-button input with no input associated with a modifier input;
determine a first display object associated with the first coordinates and a second display object associated with the second coordinates;
determine a group of selected display objects including the first display object, the second display object, and third display objects, the third display objects being automatically included in the group based on being located in an area of the user display device spanning a first rectangular region defined by the first coordinates and the second coordinates, the determining the group being initiated by the first stop tracking request, the third display objects including display objects in at least two columns;
modify a first current state of the first display object to a first different state, after determining the group;
using a value selected by the user of a toggle control to set states associated with the selected display objects included in the determined group, other than the first display object, to either the first different state or, for each particular selected display object, a state different than a previous state of the particular selected display object;
receive a second one-button input from the user, with no input associated with a modifier input, indicating a second start tracking request and including information identifying third coordinates of the user-controlled object on the user display device, at a time when the user-controlled object is located at the third coordinates and the user initiates the second start tracking request, and after the first current state is modified; and
determine a fourth display object associated with the third coordinates wherein the fourth display object is different from the first display object and the modified state of the first display object is maintained upon receipt of the second start tracking request.

20. The computer-implemented method of claim 1, wherein the first display object, the second display object, and the third display objects each represent a block of time.

21. The computer-implemented method of claim 1, wherein the first display object, the second display object, and the third display objects each represent a cell in a table.

22. The computer-implemented method of claim 1, wherein the modifier input is from a SHIFT key, a Control (Ctrl) key, or an Alt key.

23. The system of claim 11, wherein the first display object, the second display object, and the third display objects each represent a block of time.

24. The system of claim 11, wherein the first display object, the second display object, and the third display objects each represent a cell in a table.

25. The computer program product of claim 19, wherein the first display object, the second display object, and the third display objects each represent a block of time.

26. The computer program product of claim 19, wherein the first display object, the second display object, and the third display objects each represent a cell in a table.

* * * * *